(12) United States Patent
Lee

(10) Patent No.: US 10,613,574 B2
(45) Date of Patent: Apr. 7, 2020

(54) CONTROL STICK OF MOTION SIMULATOR

(71) Applicant: MOTION DEVICE INC., Anyang-si, Gyeonggi-do (KR)

(72) Inventor: John Chan Lee, Anyang-si (KR)

(73) Assignee: MOTION DEVICE INC., Anyang-si (KR)

( * ) Notice: Subject to any disclaimer, the term of this patent is extended or adjusted under 35 U.S.C. 154(b) by 291 days.

(21) Appl. No.: 15/804,708

(22) Filed: Nov. 6, 2017

(65) Prior Publication Data
US 2018/0136687 A1 May 17, 2018

(30) Foreign Application Priority Data

Nov. 11, 2016 (KR) .......................... 10-2016-0150091

(51) Int. Cl.
| | | |
|---|---|---|
| G09B 9/08 | (2006.01) | |
| G05G 9/047 | (2006.01) | |
| G09B 9/28 | (2006.01) | |

(52) U.S. Cl.
CPC .............. *G05G 9/047* (2013.01); *G09B 9/28* (2013.01); *G05G 2009/04703* (2013.01); *G05G 2009/04748* (2013.01)

(58) Field of Classification Search
USPC ............... 434/29, 33, 34, 37, 45, 49, 51, 55; 345/161; 463/38
See application file for complete search history.

(56) References Cited

U.S. PATENT DOCUMENTS

| | | | | | |
|---|---|---|---|---|---|
| 2,937,458 | A | * | 5/1960 | Lenthold | ................ G09B 9/28 434/45 |
| 4,386,914 | A | * | 6/1983 | Dustman | ............... A63H 30/04 244/190 |
| 4,422,851 | A | * | 12/1983 | Hayashigawa | .......... G09B 9/28 244/223 |
| 4,527,980 | A | * | 7/1985 | Miller | .................... G06T 15/10 434/51 |
| 4,820,162 | A | * | 4/1989 | Ross | .................. G05G 9/04788 200/6 A |

(Continued)

FOREIGN PATENT DOCUMENTS

| | | |
|---|---|---|
| KR | 10-0955383 B1 | 4/2010 |
| KR | 10-2015-0167859 | 11/2015 |

*Primary Examiner* — Kurt Fernstrom
(74) *Attorney, Agent, or Firm* — Stein IP, LLC

(57) ABSTRACT

Provided is a control stick capable of measuring rotation angles thereof and automatically returning to an original point after the rotational movements. The control stick includes a rotating rod rotated in a yawing direction and a pitching direction, a first spring which returns the rotating rod to an original point when the rotating rod rotates in the yawing direction, a first rotation angle measurement portion which measures a rotation angle of the rotating rod in the yawing direction and transmits the measured rotation angle to a controller of the motion simulator, a second spring which returns the rotating rod to an original point when the rotating rod rotates in the pitching direction, and a second rotation angle measurement portion which measures a rotation angle of the rotating rod in the pitching direction and transmits the measured rotation angle to the controller of the motion simulator.

24 Claims, 22 Drawing Sheets

(56) References Cited

U.S. PATENT DOCUMENTS

| | | | | |
|---|---|---|---|---|
| 5,125,602 A * | 6/1992 | Vauvelle | ............... | B64C 13/12 |
| | | | | 244/223 |
| 5,158,459 A * | 10/1992 | Edelberg | ............... | G09B 9/28 |
| | | | | 434/43 |
| 6,067,077 A * | 5/2000 | Martin | ................ | A63F 13/06 |
| | | | | 345/161 |
| 8,746,627 B2 * | 6/2014 | Koo | ..................... | G09B 9/28 |
| | | | | 244/223 |
| 10,118,688 B2 * | 11/2018 | Voiles | ................ | G05G 9/047 |
| 2010/0025539 A1 * | 2/2010 | Hanlon | ............... | G05G 9/047 |
| | | | | 244/223 |

* cited by examiner

# CONTROL STICK OF MOTION SIMULATOR

CROSS-REFERENCE TO RELATED APPLICATION

This application claims priority to and the benefit of Korean Patent Application No. 10-2016-0150091, filed on Nov. 11, 2016, the disclosure of which is incorporated herein by reference in its entirety.

BACKGROUND

1. Field of the Invention

The present invention relates to a control stick of a motion simulator, and more particularly, to a control stick of a motion simulator in which a position of the control stick is automatically returnable to an original point in the motion simulator with a two-degree of freedom in rotation.

2. Discussion of Related Art

Generally, a motion simulator is an apparatus which reproduces a dynamic change according to a virtual environment controlled by a computer to allow a user to realistically feel movement in virtual reality and is widely used not only to provide flight simulation, driving simulation, and the like but is also used as a simulator in games, theaters, or the like to allow a user to have a three dimensional experience.

Although the motion simulator is known to provide yawing, pitching, and rolling rotation, an apparatus such as a flight simulator is embodied to provide two degrees of freedom in rotational movement consisting of only yawing and pitching.

As an example of the above-described motion simulator with the two degrees of freedom in rotational movement, a motion simulator of FIG. 1 is disclosed in Korean Patent Application No. 10-2015-0167859 filed by the present applicant.

The motion simulator disclosed in Korean Patent Application No. 10-2015-0167859 includes a first rotating body 10 which a user boards, a second rotating body 20 located below the first rotating body 10, a first driving portion 30 which pitch-rotates the first rotating body 10, and a second driving portion (not shown) which yaw-rotates the first rotating body 10 and the second rotating body 20 together.

The motion simulator includes a control stick 50 to allow the user to manipulate motion. As conventional art related thereto, a control stick of a motion simulator has been disclosed in Korean Patent Registration No. 10-0955383. In the conventional art, there is disclosed a technology relating to an apparatus for maintaining neutrality of a control stick for a helicopter simulation system, which automatically adjusts the control stick to a neutral position without additional manipulation.

When the control stick 50 of the motion simulator shown in FIG. 1 is manipulated to rotate the rotating body 10 in a yawing direction and a pitching direction, it is necessary to measure rotation angles of the control stick 50 in the yawing direction and the pitching direction and to transmit rotation angle measurement signals to a controller.

However, since four springs are provided diagonally in a horizontal direction and configured to return the control stick to an original point in Korean Patent Registration No. 10-0955383, it is difficult to measure the rotation angles in the yawing direction and the pitching direction.

Also, there are limitations in that the durability of the control stick is decreased by repeated manipulation of the control stick, and that even when the control stick is rotated in any one direction, a rotation signal with respect to another direction is transferred to the controller such that the accuracy of motion of the motion simulator is decreased.

SUMMARY OF THE INVENTION

Therefore, it is an aspect of the present invention to provide a control stick of a motion simulator in which rotational movements are performed in a yawing direction and a pitching direction, the control stick capable of measuring rotation angles for the motion simulator and automatically returning to an original point after the rotational movements.

It is another aspect of the present invention to provide a control stick of a motion simulator, which has increased durability and is prevented from being damaged even when manipulation is repeatedly performed.

According to one aspect of the present invention, a control stick of a motion simulator includes a rotating rod rotated by a user in a yawing direction and a pitching direction, a first spring which returns the rotating rod to an original point when the rotating rod rotates in the yawing direction, a first rotation angle measurement portion which measures a rotation angle of the rotating rod in the yawing direction and transmits the measured rotation angle to a controller of the motion simulator, a second spring which returns the rotating rod to an original point when the rotating rod rotates in the pitching direction, and a second rotation angle measurement portion which measures a rotation angle of the rotating rod in the pitching direction and transmits the measured rotation angle to the controller of the motion simulator.

The first rotation angle measurement portion may be of a rotary type which measures the rotation angle of the rotating rod in the yawing direction when the rotating rod rotates in the yawing direction.

The control stick may include a first cam which is fixed to be independent from the rotation of the rotating rod and comprises teeth formed on an outer circumferential surface; and a first gear which is engaged with the teeth of the first cam, rotates by an angle corresponding to the rotation angle of the rotating rod in the yawing direction, and is coupled to the first rotation angle measurement portion to transmit the rotation angle thereof.

The control stick may include a rotating plate to which the first rotation angle measurement portion is coupled and which also rotates when the rotating rod rotates in the yawing direction; and a fixed plate fixed to be independent from the rotation of the rotating plate and to which the first cam is connected.

The fixed plate may be stacked below the rotating plate, and the control stick comprising a first cam connection member provided between the fixed plate and the first cam, with a bottom end coupled to the fixed plate and a top end passing through the rotating plate and connected to the first cam.

The second rotation angle measurement portion may be of a rotary type which measures the rotation angle of the rotating rod in the pitching direction when the rotating rod rotates in the pitching direction.

The control stick may include a second cam which rotates as the rotating rod rotates in the pitching direction and comprises teeth formed on an outer circumferential surface; and a second gear which is engaged with the teeth of the second cam, rotates by an angle corresponding to the rotation angle of the rotating rod in the pitching direction, and is coupled to the second rotation angle measurement portion to transmit the rotation angle thereof.

The control stick may include a rotating plate to which the second rotation angle measurement portion is coupled and which is independent from the rotation of the rotating rod in the pitching direction; and a fixed plate fixed to be independent from the rotation of the rotating plate and stacked below the rotating plate.

The first spring may be formed of a torsion spring wound to allow any one of the two ends thereof to be fixed and the other end to rotate with the rotating rod and apply an elastic restoration force when the rotating rod rotates in the yawing direction.

The control stick may include a rotating plate which also rotates when the rotating plate rod rotates in the yawing direction and a fixed plate independent from the rotation of the rotating plate and stacked below the rotating plate, wherein one of the two ends of the first spring is held by a spring holding member coupled to the rotating plate and tensioned to allow the wound portion of the first spring to be twisted when the rotating plate rotates and the other end is held by a spring holding portion connected to the fixed plate, independent from the rotation of the rotating rod and fixed in position.

The control stick may include a first cam lower connection member with a bottom end coupled to the fixed plate and an exterior on which the first spring is wound; a first cam upper connection member coupled to a top end of the first cam lower connection member and at which the spring holding portion is formed; a first cam which is fixed to be independent from the rotation of the rotating rod, comprises teeth formed on an outer circumferential surface, and is coupled to the first cam upper connection member; and a first gear which is engaged with the teeth of the first cam, rotates by an angle corresponding to the rotation angle of the rotating rod in the yawing direction, and is coupled to the first rotation angle measurement portion to transmit the rotation angle thereof.

The first cam upper connection member at which the spring holding portion protrudes may connected to the fixed plate, wherein a guide groove into which the spring holding portion is inserted, guides rotation of the spring holding portion when the rotating rod rotates in the yawing direction, and into which the spring holding member is inserted is formed at the rotating plate, and wherein the spring holding portion and the spring holding member are provided at positions spaced apart in a radial direction from a rotational center of the rotating plate.

The second spring may be formed of a torsion spring wound to allow any one of the two ends thereof to be fixed and the other end to rotate with the rotating rod and apply an elastic restoration force when the rotating rod rotates in the pitching direction.

The control stick may include a second spring fixing member, which is coupled to the rotating rod to also rotate when the rotating rod rotates in the pitching direction and protrudes in an axial direction of the rotating rod and at which a spring holding portion holds one of the two ends of the second spring to allow the torsion spring to be tensioned when the rotating rod rotates in the pitching direction; and a cover at which a spring holding portion fixed in a position independent from the rotation of the rotating rod in the pitching direction and by which the one end of the two ends of the second spring is held is formed.

The cover may comprise a guide groove into which the spring holding portion of the second spring fixing member is inserted to guide rotation of the spring holding portion when the rotating rod rotates in the pitching direction.

The control stick may include a pair of such first springs are provided to face each other, wherein when the rotating rod is rotated in any one of a first yawing direction and a second yawing direction, which are opposite to each other, any one of the pair of first springs is tensioned such that an elastic restoration force acts to return the rotating rod to the original point, and wherein when the rotating rod is rotated in a direction opposite to the direction in which the first spring is tensioned, the other first spring is tensioned such that an elastic restoration force acts to return the rotating rod to the original point.

One end of the first spring may be connected to the rotating plate which also rotates when the rotating rod rotates in the yawing direction, and the other end thereof is connected to the fixed plate fixed to be independent from the rotation of the rotating rod in the yawing direction.

A pair of rotating plate holding portions may protrude from the rotating plate, by which the one ends of the first springs are held, wherein a plurality of bottom plate holding portions protrude from the bottom plate, by which the other ends of the first springs are held, wherein a pair of bottom plate guide holes formed of long holes having sections along a rotational direction of the rotating plate to allow the rotating plate holding portion to be inserted therein to guide the rotation of the rotating plate, and wherein the one end and the other end of the first spring are connected to the rotating plate holding portion and the bottom plate holding portion, respectively.

The first spring may comprise: a first holding end and a second holding end formed on both ends thereof to be held by the rotating plate holding portion and the bottom plate holding portion, respectively; a wound portion connected to the first holding end and wound in a coil spring shape; and a rotation absorber which connects the second holding end to the wound portion and has a section for allowing the bottom plate holding portion to be inserted therein to absorb rotation of the rotating plate to prevent the wound portion from being compressed.

A pair of such second springs may be provided to face each other, wherein when the rotating rod is rotated in any one of a first pitching direction and a second pitching direction, which are opposite to each other, any one of the pair of second springs is tensioned such that an elastic restoration force acts to return the rotating rod to the original point, and wherein when the rotating rod is rotated in a direction opposite to the direction in which the second spring is tensioned, the other second spring is tensioned such that an elastic restoration force acts to return the rotating rod to the original point.

A spring holding member may be integrated and coupled with the rotating rod, wherein a rotating plate which also rotates when the rotating rod rotates in the yawing direction is provided, wherein one ends of the pair of second springs are held by both ends of the spring holding member, and wherein the other ends of the pair of second springs are held by one side and the other side of the rotating plate.

The second spring may comprise: a first holding end and a second holding end formed on both ends thereof to be held by the spring holding member and the rotating plate, respectively; a wound portion connected to the second holding end and wound in a coil spring shape; and a rotation absorber which connects the first holding end to the wound portion and has a section for allowing a holding portion of the spring holding member to be inserted therein to absorb rotation of the rotating rod to prevent the wound portion from being compressed.

The control stick may further comprise: a first cam fixed to be independent from the rotation of the rotating rod in the yawing direction; and a first sliding member which comprises a slot into which a pin coupled to an end of the first cam is inserted, wherein a mover of the first rotation angle measurement portion is integrated and coupled with one side of the first sliding member, and wherein a rotation angle of the rotating rod in the yawing direction, corresponding to a linear movement of the mover when the rotating rod rotates in the yawing direction, is measured by the first rotation angle measurement portion.

The control stick may further comprise: a second cam which rotates according to the rotation of the rotating rod in the pitching direction; and a second sliding member which comprises a slot into which a pin coupled to an end of the second cam is inserted, wherein a mover of the second rotation angle measurement portion is integrated and coupled with one side of the second sliding member, and wherein a rotation angle of the rotating rod in the pitching direction, corresponding to a linear movement of the mover when the rotating rod rotates in the pitching direction, is measured by the second rotation angle measurement portion.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
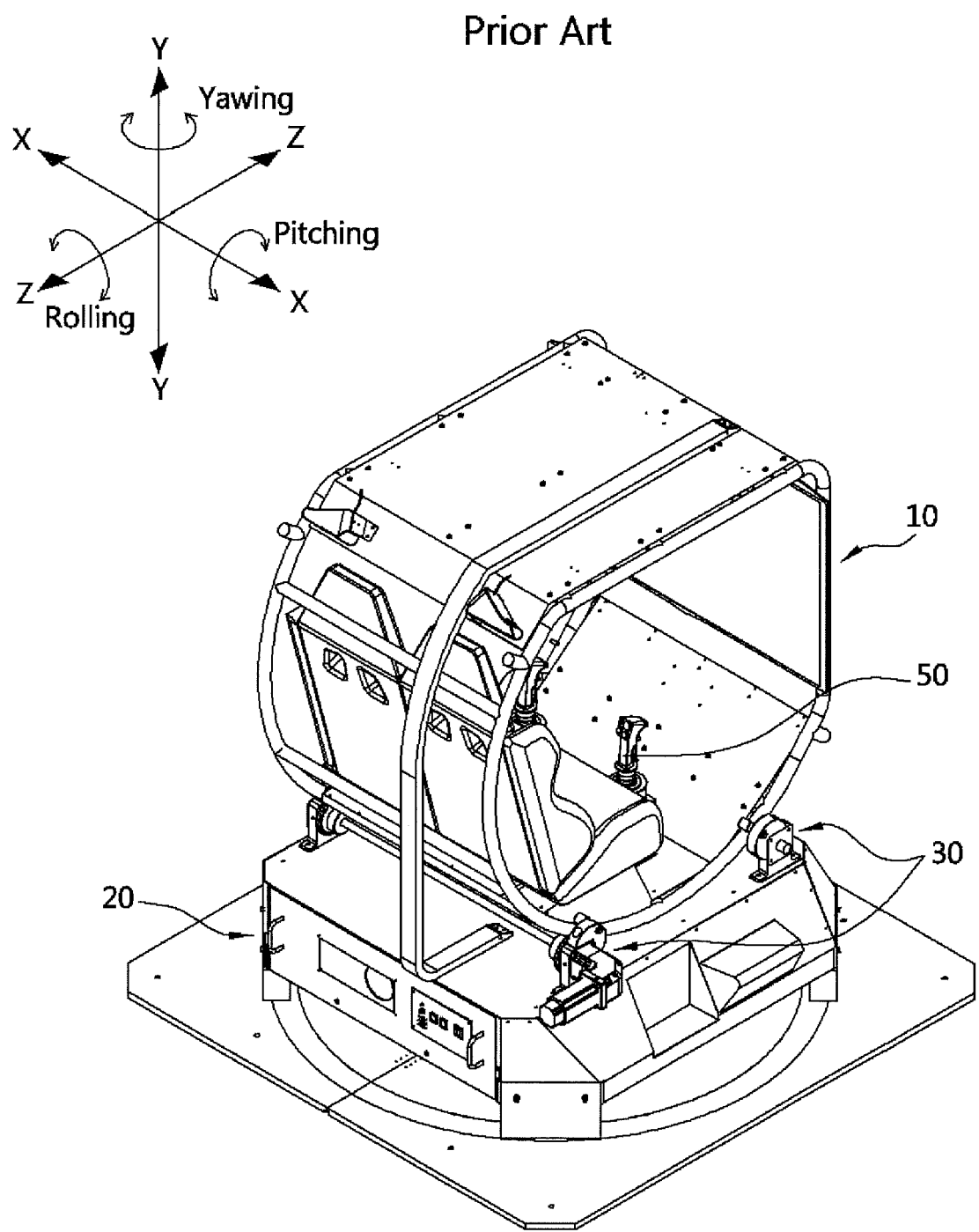
FIG. 1 is a perspective view of a conventional motion simulator with two degrees of freedom in rotation.
Figure 2:
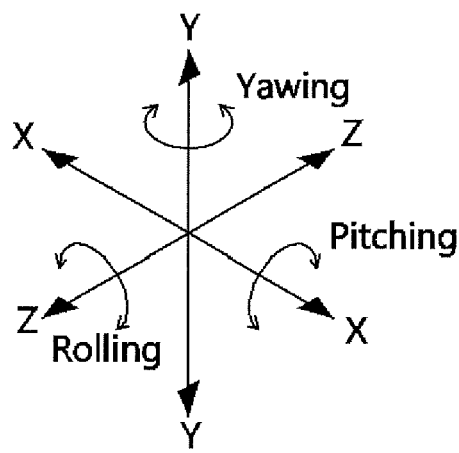
FIG. 2 is a perspective view illustrating an exterior of a control stick according to a first embodiment of the present invention.
Figure 2:
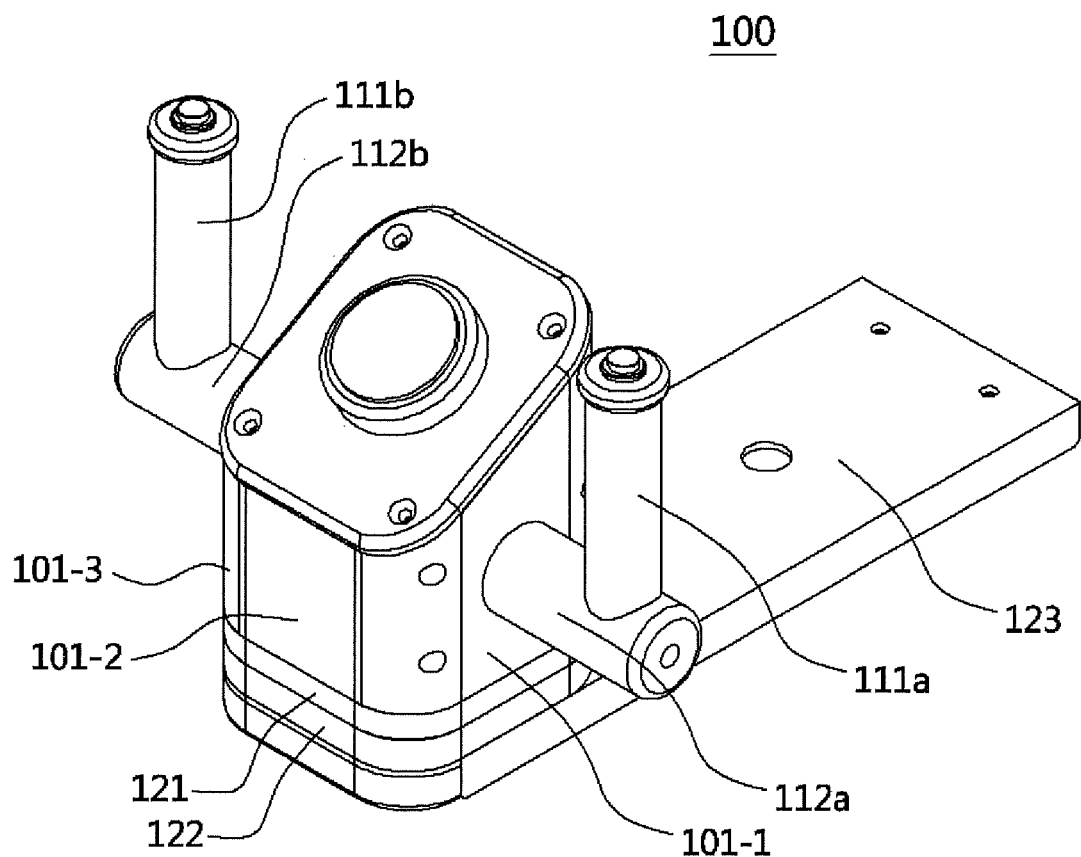
Figure 3:
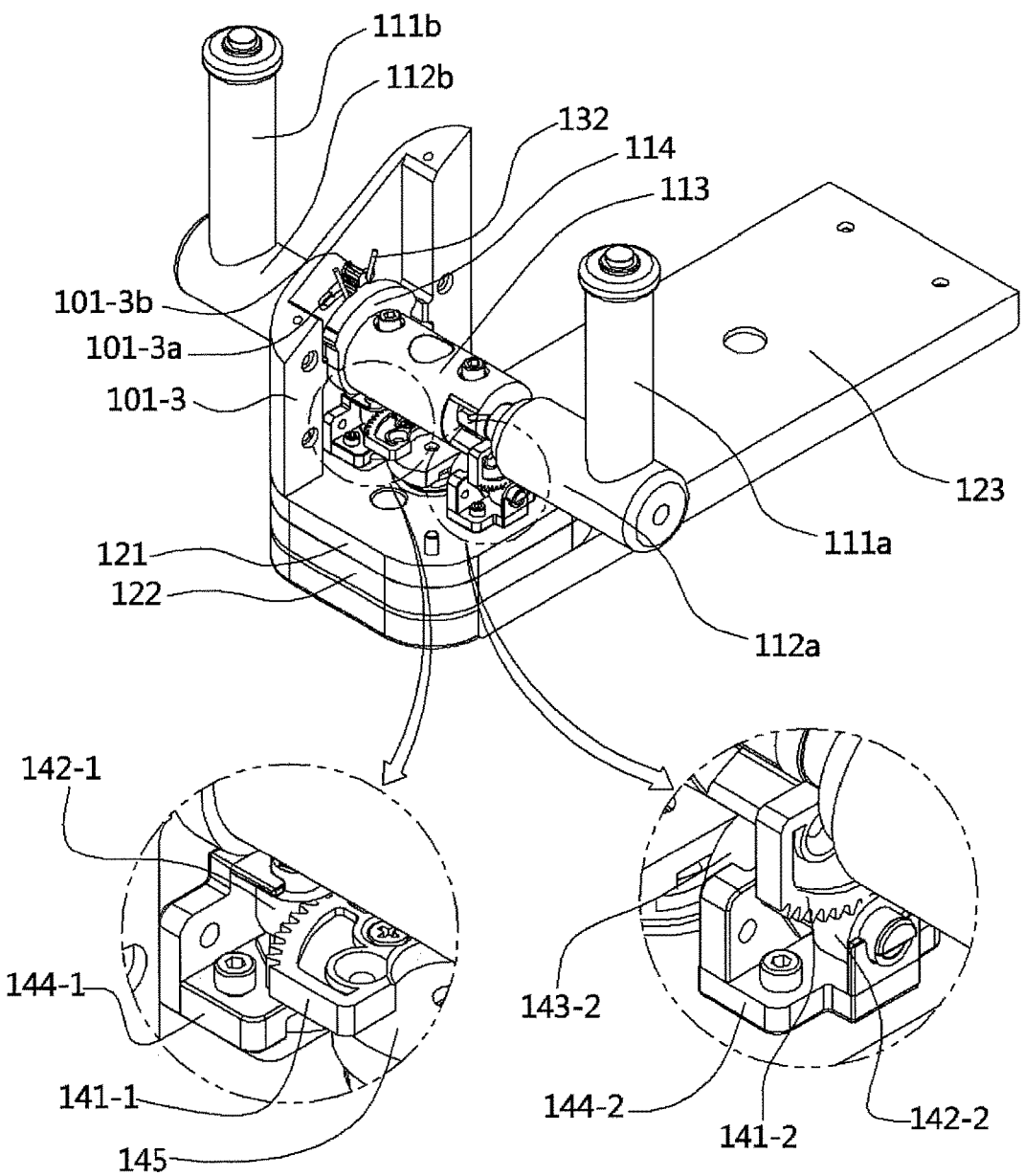
FIG. 3 is a perspective view illustrating a state in which a cover is removed from the control stick of FIG. 2 in an original state.
Figure 4:
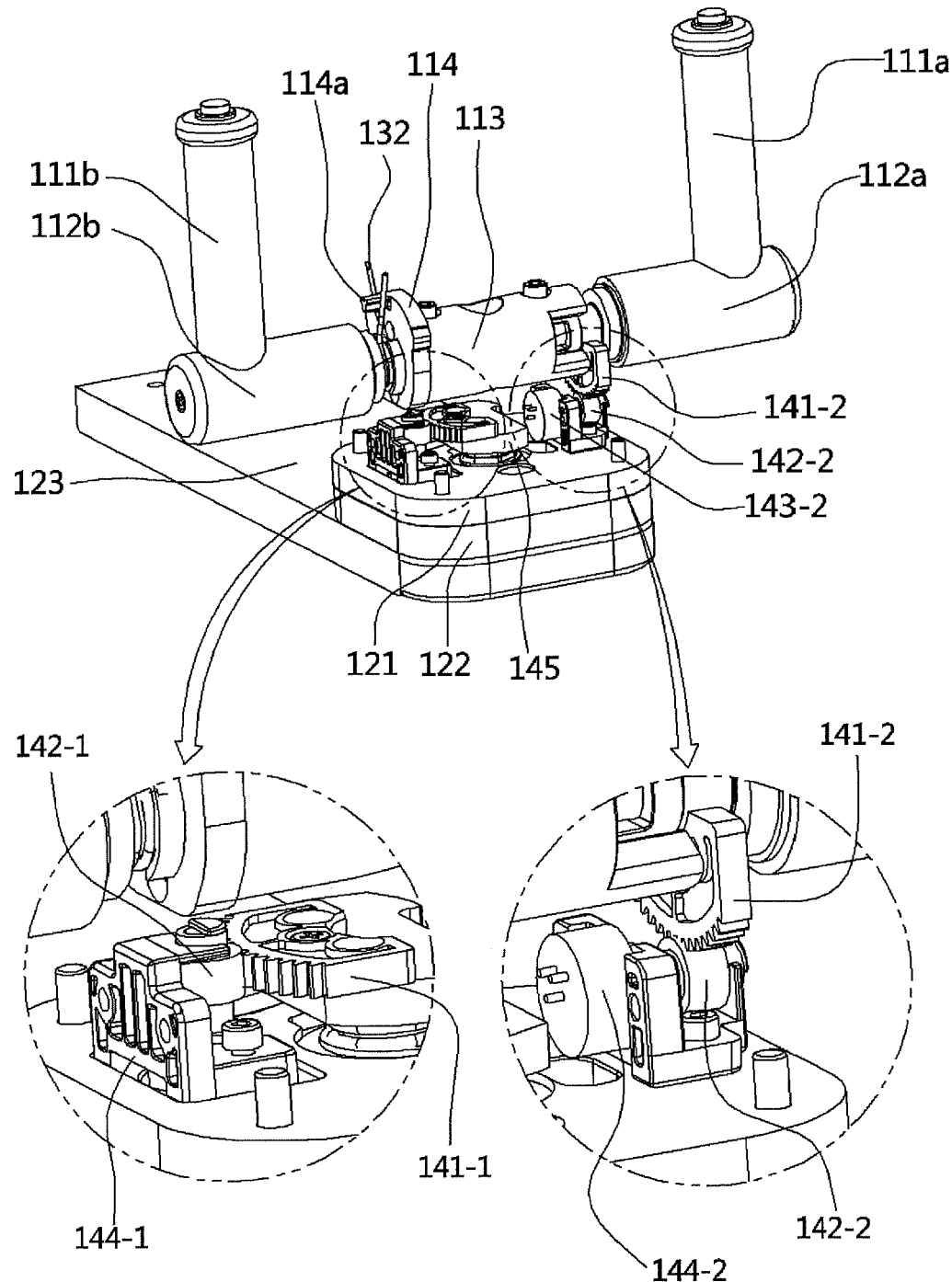
FIG. 4 is a perspective view of the control stick of FIG. 3 viewed from another angle.
Figure 5:
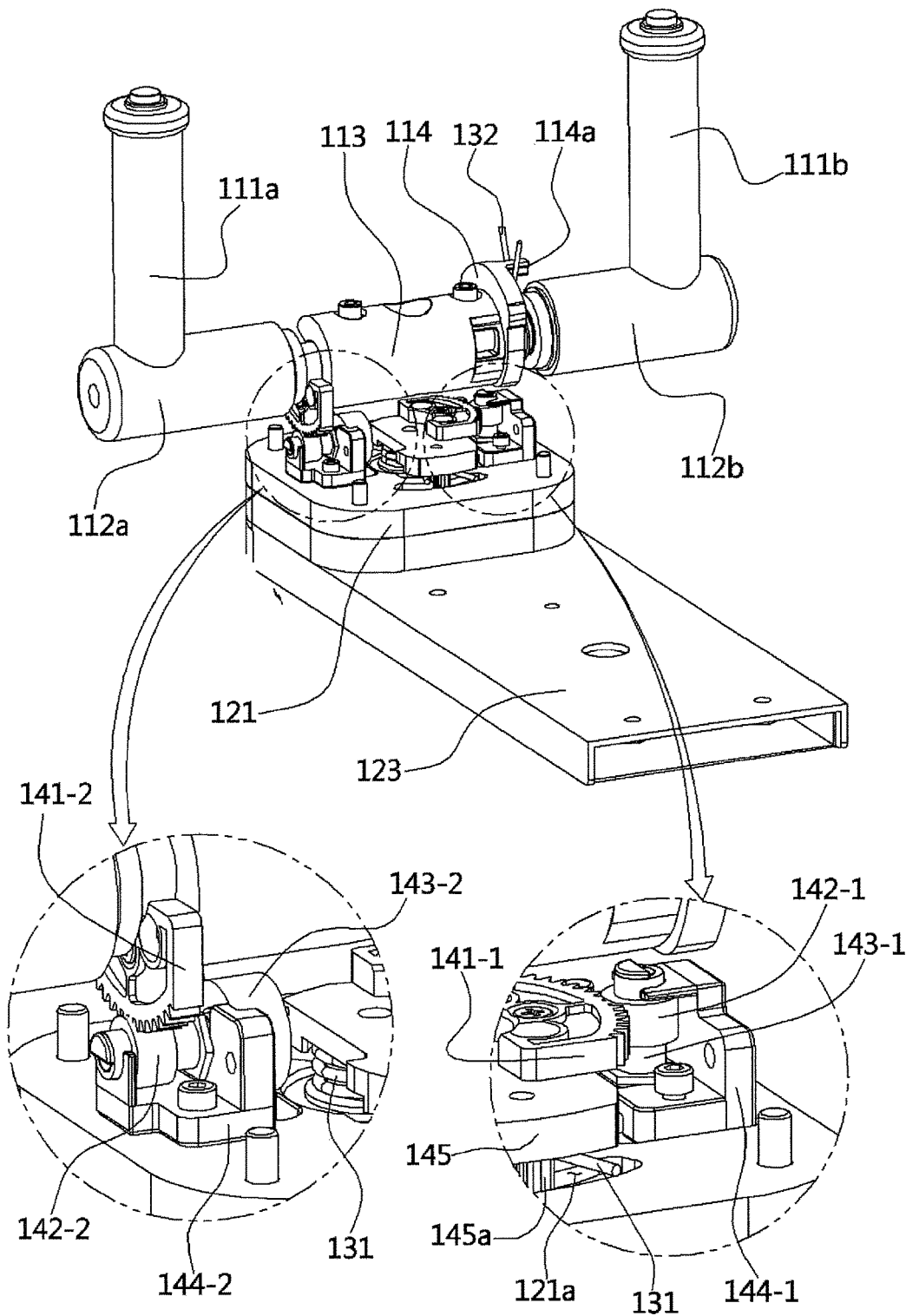
FIG. 5 is a perspective view of the control stick of FIG. 3 viewed from still another angle.

Hereinafter, a control stick of a motion simulator according to one embodiment of the present invention will be described in detail with reference to the attached drawings. As shown in FIGS. 1 and 2, rolling refers to a rotational movement with a forward and backward direction (Z-axis) as a rotational center, pitching refers to a rotational movement with a leftward and rightward direction (X-axis) as a rotational center, and yawing refers to a rotational movement with a vertical direction as a rotational center.

First Embodiment

Referring to FIGS. 2 to 8, a control stick 100 of a motion simulator according to a first embodiment will be described.

The control stick 100 of the motion simulator according to the first embodiment includes a rotating rod 113 rotated in a yawing direction and a pitching direction by a user, a first spring 131 which returns the rotating rod 113 to an original point when the rotating rod 113 is rotated in the yawing direction, a first rotation angle measurement portion 143-1 which measures a rotation angle of the rotating rod 113 in the yawing direction and transmits the measured rotation angle to a controller (not shown) of the motion simulator, a second spring 132 which returns the rotating rod 113 to the original point when the rotating rod 113 is rotated in the pitching direction, and a second rotation angle measurement portion 143-2 which measures a rotation angle of the rotating rod 113 in the pitching direction and transmits the measured rotation angle to the controller of the motion simulator.

Covers 101-1, 101-2, 101-3, and 101-4, which surround outsides of the rotating rod 113, the first and second springs 131 and 132, and the first and second rotation angle measurement portions 143-1 and 143-2, respectively.

The covers 101-1, 101-2, 101-3, and 101-4 may be configured to be separated into four pieces to surround four sides of the control stick 100 or may be four covers coupled with one another.

A rotating plate 121, a fixed plate 122, and a bottom plate 123 are provided in a stacked structure below the covers 101-1, 101-2, 101-3, and 101-4. The rotating plate 121 is integrated and coupled with the covers 101-1, 101-2, 101-3, and 101-4 and rotates with the rotating rod 113 in the yawing direction. The fixed plate 122 and the bottom plate 123 are independent from the rotation of the rotating rod 113, do not rotate, and remain in a fixed state.

There are provided a pair of handle-connected rods 112a and 112b and a pair of handles 111a and 111b which protrude toward both sides of a pair of left and right covers 101-1 and 101-3 which face each other among the four covers 101-1, 101-2, 101-3, and 101-4. The pair of covers 101-1 and 101-3 may include through holes formed to allow the handle-connected rods 112a and 112b to pass therethrough.

The pair of handle-connected rods 112a and 112b are coupled with both sides of the rotating rod 113 and have a certain length in the same direction as a longitudinal direction of the rotating rod 113.

The pair of handles 111a and 111b are coupled with both sides of the handle-connected rods 112a and 112b and have a certain length in a radial direction vertical to the longitudinal direction of the rotating rod 113.

When the user holds and rotates the handles 111a and 111b in the yawing direction, the handle-connected rods 112a and 112b, the rotating rod 113, the handles 111a and 111b, and the covers 101-1, 101-2, 101-3, and 101-4 integrally rotate around a first cam lower connection member 147 which will be described below as a rotational center thereof.

When the user holds and rotates the handles 111a and 111b in the pitching direction, the handle-connected rods 112a and 112b, the rotating rod 113, and the handles 111a and 111b integrally rotate around a central axis along a longitudinal direction of the rotating rod 112 as a rotational center thereof. In this case, since the handle-connected rods 112a and 112b rotate in the through holes of the covers 101-1 and 101-3, the covers 101-1, 101-2, 101-3, and 101-4 remain in a fixed state.

The first rotation angle measurement portion 143-1 is of a rotary type which measures a rotation angle in the yawing direction when the rotating rod 113 rotates in the yawing direction and may be formed to be a potentiometer.

A first bracket 144-1 is coupled with a top of the rotating plate 121 using a fastening member, and the first rotation angle measurement portion 143-1 is fixed to the first bracket 144-1. A first gear 142-1 which includes teeth formed on an outer circumferential surface is coupled with the first rotation angle measurement portion 143-1.

A first cam 141-1 which includes teeth formed on an outer circumferential surface engages with the first gear 142-1. The first cam 141-1 is coupled with a first cam upper connection member 145, the first cam upper connection member 145 is coupled with a top end of the first cam lower connection member 147, and the first cam lower connection member 147 passes through the rotating plate 121 and a bottom end thereof is coupled with the fixed plate 122. Accordingly, the first cam 141-1, the first cam upper connection member 145, the first cam lower connection member 147, and the fixed plate 122 are independent from the rotation of the rotating plate 121 in the yawing direction and are positioned to be fixed. A bearing 149 is inserted into a through hole 121a of the rotating plate 121, and the first cam lower connection member 147 passes through the bearing 149 and the bottom end thereof is coupled with a coupling groove 122a of the fixed plate 122.

The first cam 141-1 and the first gear 142-1 are engaged with each other at the teeth thereof. Accordingly, when the rotating rod 113 is rotated in the yawing direction, the rotating plate 121 and the first rotation angle measurement portion 143-1 rotate together. In this case, since the first cam 141-1 does not rotate and is fixed, the first gear 142-1 coupled to the first rotation angle measurement portion 143-1 rotates on a central axis thereof by an angle corresponding to the rotation angle of the rotating rod 113 in the yawing direction. When the first gear 142-1 rotates on its axis, the rotation is transferred to the first rotation angle measurement portion 143-1 such that a resistance value is changed in the first rotation angle measurement portion 143-1. Accordingly, the rotation angle in the yawing direction is measured from the changed resistance value.

The first spring 131 is a torsion spring and includes a wound portion 131a wound a plurality of times outside a central shaft in a coil spring shape, a first end 131b connected to one end of the wound portion 131a, and a second end 131c connected to the other end of the wound portion 131a.

A spring holding portion 145a, which protrudes downward from a bottom surface of the first cam upper connection member 145 in a vertical direction, and a spring holding member 148, which is integrated and coupled with a top surface of the rotating plate 121 and protrudes upward, are provided between the first end 131b and the second end 131c of the first spring 131. The spring holding portion 145a and the spring holding member 148 are provided at positions spaced apart from a center of the rotating plate 121 in a radial direction such that interference with the spring holding portion 145a does not occur even when the spring holding member 148 rotates with the rotating plate 121 in the yawing direction.

When the rotating rod 113 and the rotating plate 121 rotate in a first yawing direction from original positions (a counterclockwise direction in an overhead view), the first end 131b is fixed at a position thereof while being held by the spring holding portion 145a, and the second end 131c rotates in the first yawing direction while being held by the spring holding member 148 such that the wound portion 131a is tensioned by torsion.

On the other hand, when the rotating rod 113 and the rotating plate 121 rotate in a second yawing direction from the original positions (a clockwise direction in an overhead view), the second end 131c is fixed at a position thereof while being held by the spring holding portion 145a, and the first end 131b rotates in the second yawing direction while being held by the spring holding member 148 such that the wound portion 131a is tensioned by torsion.

When the wound portion 131a is tensioned as described above and then the user releases a force applied in the yawing direction to the rotating rod 113, an elastic restoration force of the wound portion 131a acts and returns the wound portion 131a to the original point.

Here, the original point refers to a state in which the rotating rod 113 does not rotate in the yawing direction. The spring holding portion 145a and the spring holding member 148 are located in a central part of a guide groove 121b formed on a top surface of the rotating plate 121.

The wound portion 131a is wound along an outer perimeter of the first cam lower connection member 147. A top end of the first cam lower connection member 147 has an approximately quadrangular shape with rounded corners, and a bottom surface of the first cam upper connection member 145 includes a groove (not shown) formed in a corresponding shape to allow the top end of the first cam lower connection member 147 to be inserted thereinto.

The spring holding portion 145a and the spring holding member 148 are inserted in the guide groove 121b of the rotating plate 121, and the guide groove 121b has a circular arc shape to guide the rotation of the spring holding portion 145a when the rotating plate 121 rotates in the yawing direction.

In this case, when the rotation angle of the rotating rod 113 in the yawing direction exceeds a certain angle, the spring holding portion 145a or the spring holding member 148 is held by any one end of the guide groove 121b such that the rotation angle of the rotating rod 113 in the yawing direction is limited by a section of the guide groove 121b.

The second rotation angle measurement portion 143-2 is of a rotary type which measures a rotation angle in a pitching direction when the rotating rod 113 rotates in the pitching direction and may be formed to be a potentiometer.

A second bracket 144-2 is coupled with the top of the rotating plate 121 using a fastening member, and the second rotation angle measurement portion 143-2 is fixed to the second bracket 144-2. A second gear 142-2 which includes teeth formed on an outer circumferential surface is coupled with the second rotation angle measurement portion 143-2.

A second cam 141-2 which includes teeth formed on an outer circumferential surface engages with the second gear 142-2. The second cam 141-2 is integrated and coupled with the handle-connected rod 112a coupled with the rotating rod 113. Accordingly, the second cam 141-2 rotates with the rotating rod 113 during pitching rotation of the rotating rod 113.

When the user holds and rotates the handles 111a and 111b in the pitching direction, the rotating rod 113 and the second cam 141-2 rotate together in the pitching direction. In this case, the second gear 142-2 which engages with the second cam 141-2 rotates on a central axis thereof by an angle corresponding to a rotation angle of the rotating rod 113 in the pitching direction. When the second gear 142-2 rotates on its axis, the rotation is transferred to the second rotation angle measurement portion 143-2 such that a resistance value is changed in the second rotation angle measurement portion 143-2. Accordingly, the rotation angle in the pitching direction is measured from the changed resistance value.

The second spring 132 is a torsion spring and includes a wound portion 132a wound a plurality of times outside a central shaft in a coil spring shape, a first end 132b connected to one end of the wound portion 132a, and a second end 132c connected to the other end of the wound portion 132a.

A spring holding portion 101-3b (refer to FIG. 10), which protrudes from an inner surface of the cover 101-3 in an axial direction of the rotating rod 113, and a spring holding portion 114a, which protrudes from a side of a second spring fixing member 114 in a direction opposite to the spring holding portion 101-3b, are provided between the first end 132b and the second end 132c of the second spring 132.

Since the spring holding portion 101-3b and the spring holding portion 114a are provided at positions spaced apart from the central shaft of the rotating rod 113 in a radial direction, interference between the spring holding portion 101-3b and the spring holding portion 114a does not occur when the second spring fixing member 114 and the rotating rod 113 rotate together in the pitching direction.

When the rotating rod 113 rotates in a first pitching direction from original positions (in a clockwise direction when viewed from a right side of the control stick 100), the first end 132b is fixed at a position thereof while being held by the spring holding portion 101-3b and the second end 132c rotates in the first pitching direction while being held by the spring holding portion 114a such that the wound portion 132a is tensioned by torsion.

On the other hand, when the rotating rod 113 rotates in a second pitching direction from the original positions (in a counterclockwise direction when viewed from the right side of the control stick 100), the second end 132c is fixed at a position thereof while being held by the spring holding portion 101-3b and the first end 132b rotates in the second pitching direction while being held by the spring holding portion 114a such that the wound portion 132a is tensioned by torsion.

When the wound portion 132a is tensioned as described above and then the user releases a force applied in the pitching direction to the rotating rod 113, an elastic restoration force of the wound portion 132a acts and returns the wound portion 131a to the original point.

In the original state, the spring holding portion 101-3b and the spring holding portion 114a are located in a center of a guide groove 101-3a of the cover 101-3.

Figure 6:
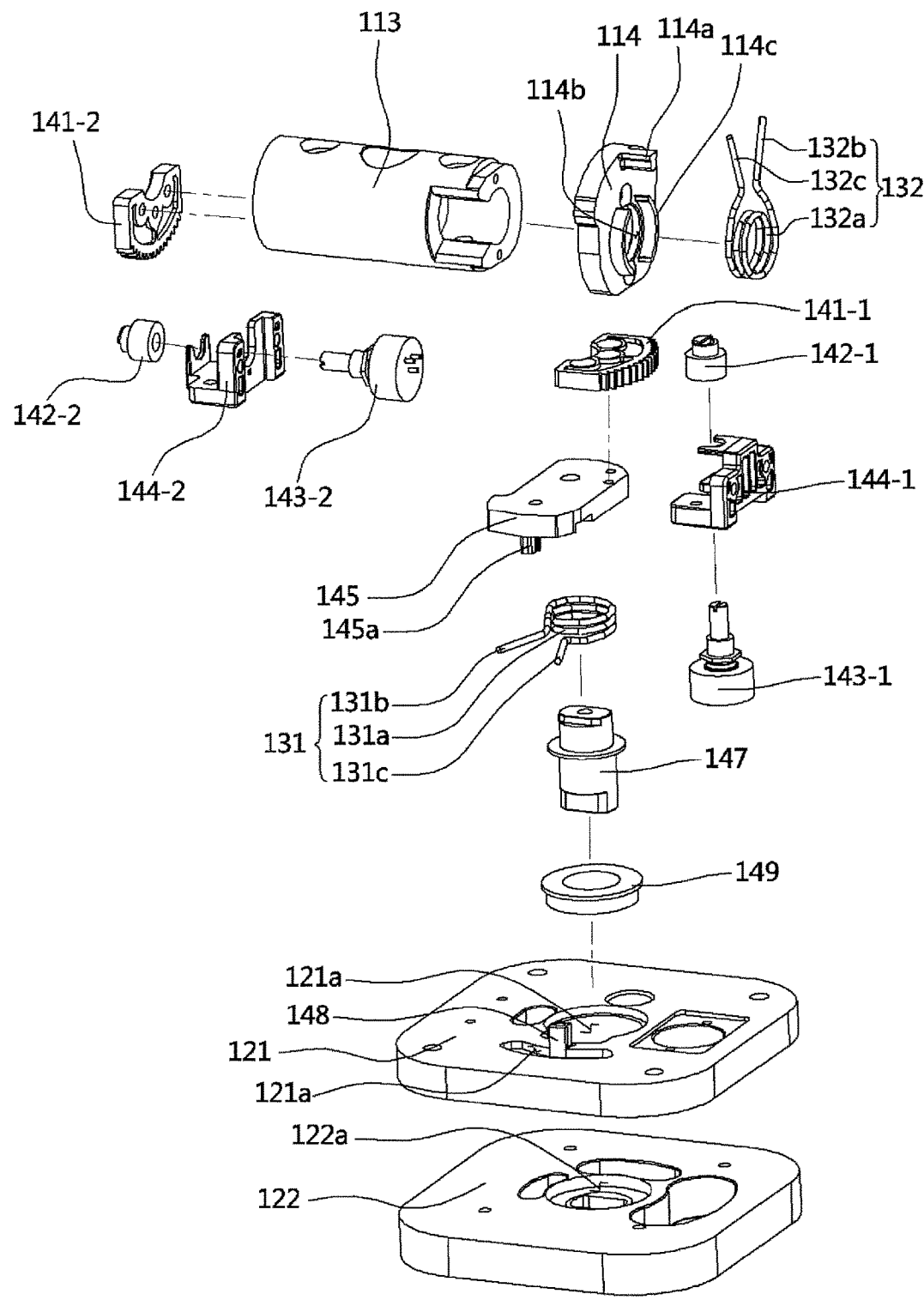
FIG. 6 is an exploded perspective view illustrating some components of the control stick of FIG. 3.
Figure 7:
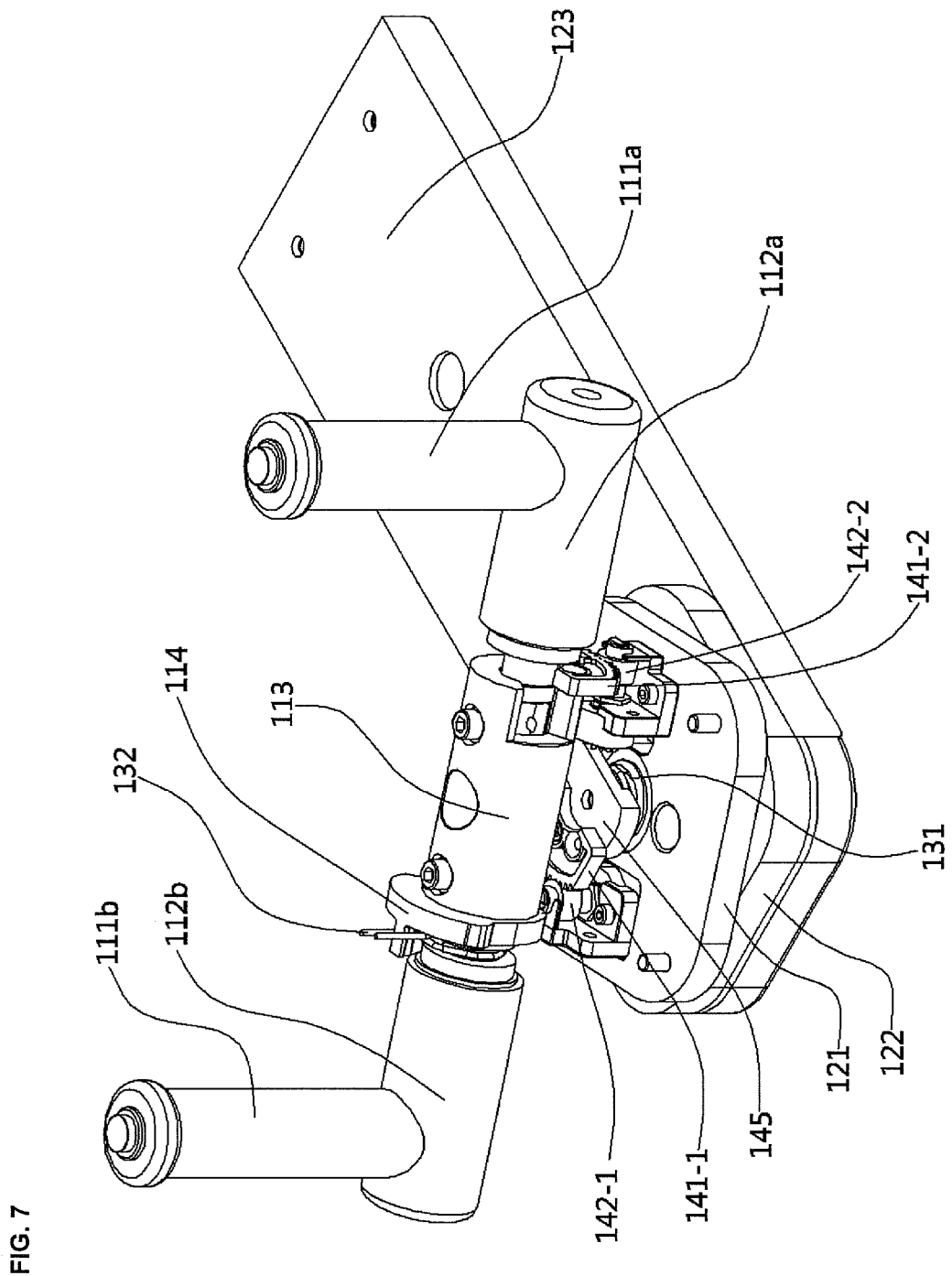
FIG. 7 is a perspective view illustrating a state in which the control stick of FIG. 3 has been rotated in a yawing direction.
Figure 8:
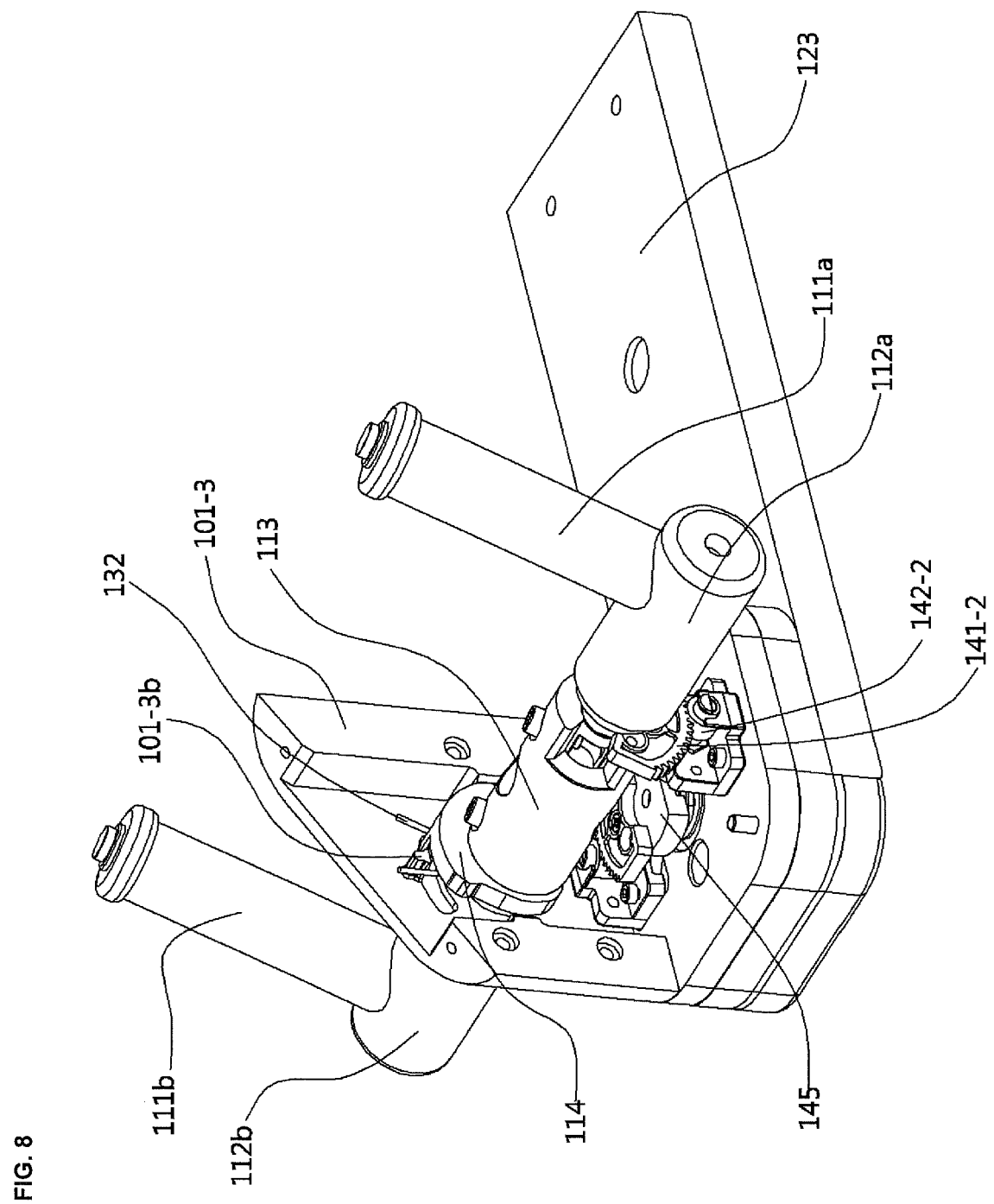
FIG. 8 is a perspective view illustrating a state in which the control stick of FIG. 3 has been rotated in a pitching direction.

The wound portion 132a is mounted while being wound on a second spring mount portion 114b formed on an outer surface of the second spring fixing member 114 (refer to FIG. 6). When the second spring mount portion 114b may be mounted on an inside of a flange 114c which protrudes from a side of the second spring fixing member 114.

The second spring fixing member 114 is provided between the rotating rod 113 and the handle-connected rod 112b and is coupled to integrally rotate with the rotating rod 113 and the handle-connected rod 112b in the pitching direction.

The spring holding portion 114a is inserted in the guide groove 101-3a of the cover 101-3, and the guide groove 101-3a has a circular arc shape to guide the rotation of the spring holding portion 114a when the rotating rod 113 rotates in the pitching direction.

In this case, when the rotation angle of the rotating rod 113 in the pitching direction exceeds a certain angle, the spring holding portion 114a is held by any one end of the guide groove 101-3a such that the rotation angle of the rotating rod 113 in the pitching direction is limited by a section of the guide groove 101-3a.

Figure 9A:
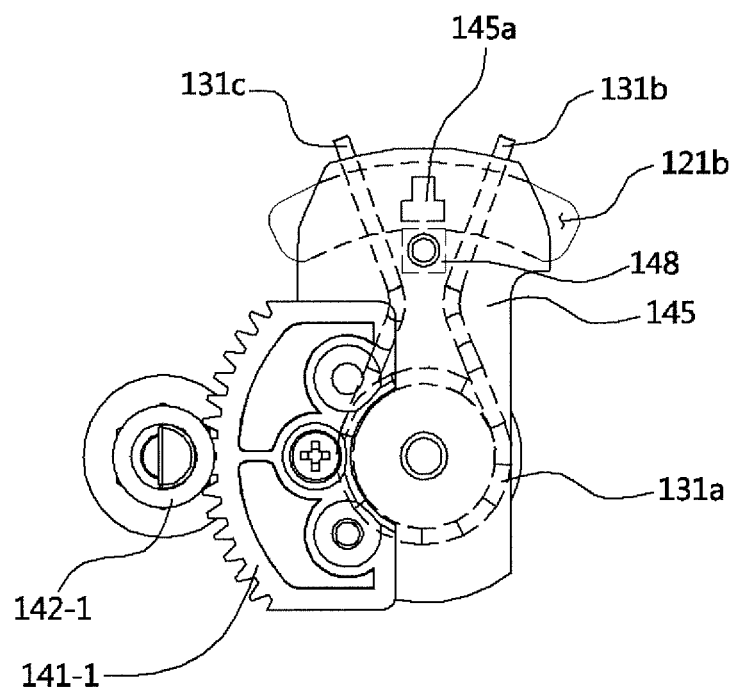
FIGS. 9A and 9B are plan views illustrating the control stick of FIG. 3 before and after rotation in the yawing direction.
Figure 9B:
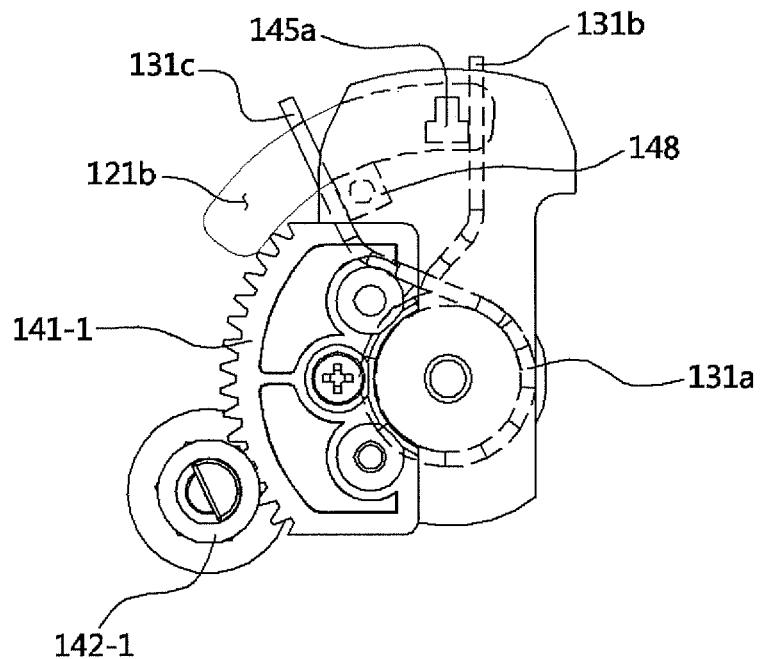

Referring to FIGS. 9A and 9B, an operation of a case in which the control stick 100 according to the first embodiment is rotated in the yawing direction will be described.

FIG. 9A illustrates a case in which the handles 111a and 111b, the handle-connected rods 112a and 112b, and the rotating rod 113 do not rotate and are in the original state.

The spring holding portion 145a, which protrudes from the first cam upper connection member 145, and the spring holding member 148, which is coupled to the rotating plate 121, are located between the first end 131b and the second end 131c of the first spring, on different radii from the center of the rotating plate 121. Here, the spring holding portion 145a and the spring holding member 148 are inserted in the guide groove 121b of the rotating plate 121.

When the user holds the handles 111a and 111b and rotates the rotating rod 113 in the yawing direction in the state of FIG. 9A, a state shown in FIG. 9B occurs.

The rotating plate 121, the spring holding member 148, and the first gear 142-1 rotate, according to the rotation of the rotating rod 113, around the central shaft of the rotating plate 121 as a rotational center. At the same time, the first gear 142-1 rotates on its axis. On the other hand, the first cam 141-1, the first cam upper connection member 145, and the spring holding portion 145*a* integrated therewith do not rotate and are fixed.

Also, as the spring holding member 148 rotates, the second end 131*c* of the first spring 131 is held and rotates therewith. In this case, the first end 131*b* of the first spring 131 becomes held by the spring holding portion 145*a* and does not rotate any more.

Due to this, the wound portion 131*a* of the first spring 131 is tensioned. When the user rotates the handles 111*a* and 111*b* to the original point or releases the handles 111*a* and 111*b*, the wound portion 131*a* is returned to the original state of FIG. 9A due to an elastic restoration force thereof.

Also, as the first gear 142-1 rotates on its axis, the first rotation angle measurement portion 143-1 measures the rotation angle in the yawing direction.

Figure 10A:
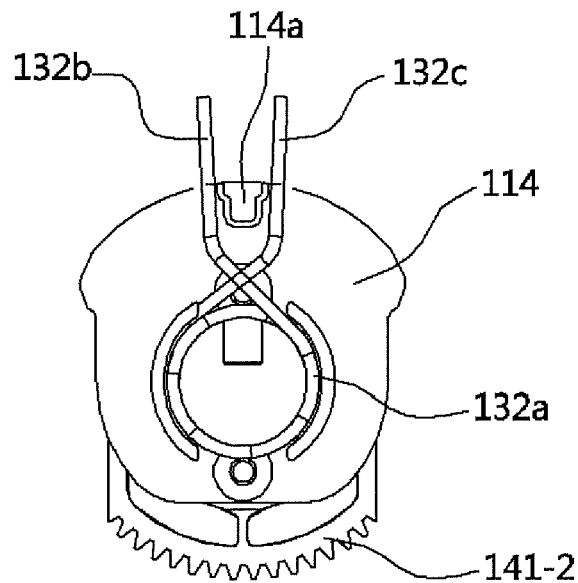
FIGS. 10A and 10B are a left side view and a right side view illustrating the control stick of FIG. 3 before and after rotation in the pitching direction, respectively.
Figure 10B:
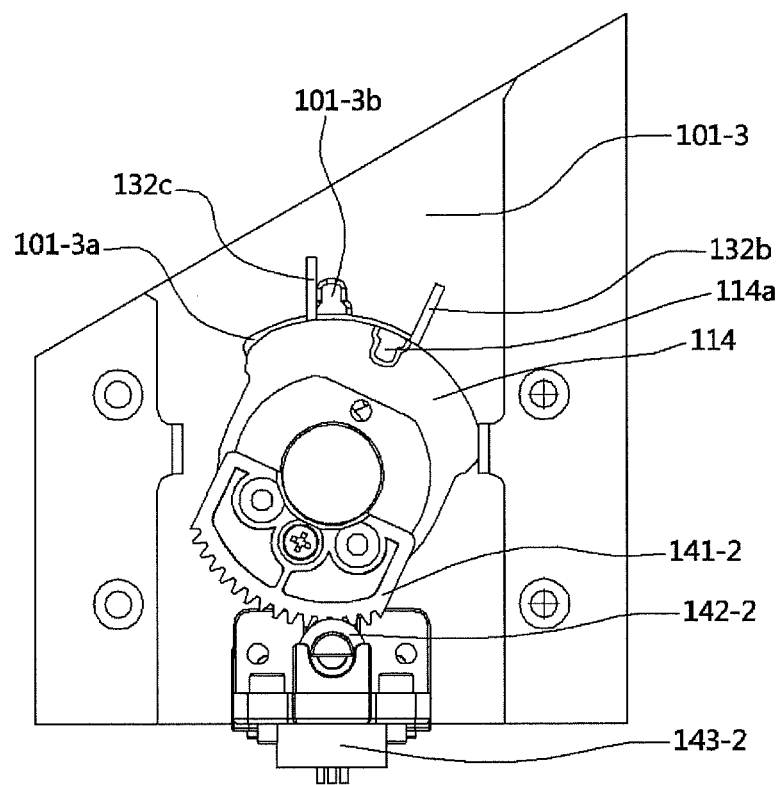
Figure 11:
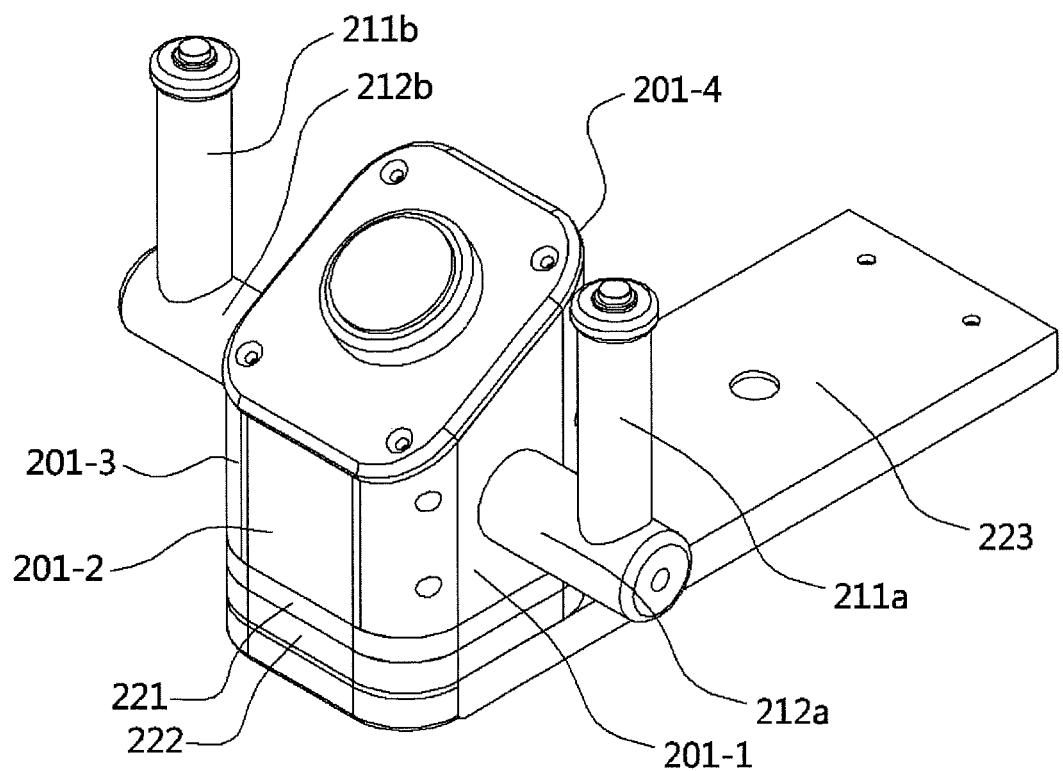
FIG. 11 is a perspective view illustrating an exterior of a control stick according to a second embodiment of the present invention.
Figure 12:
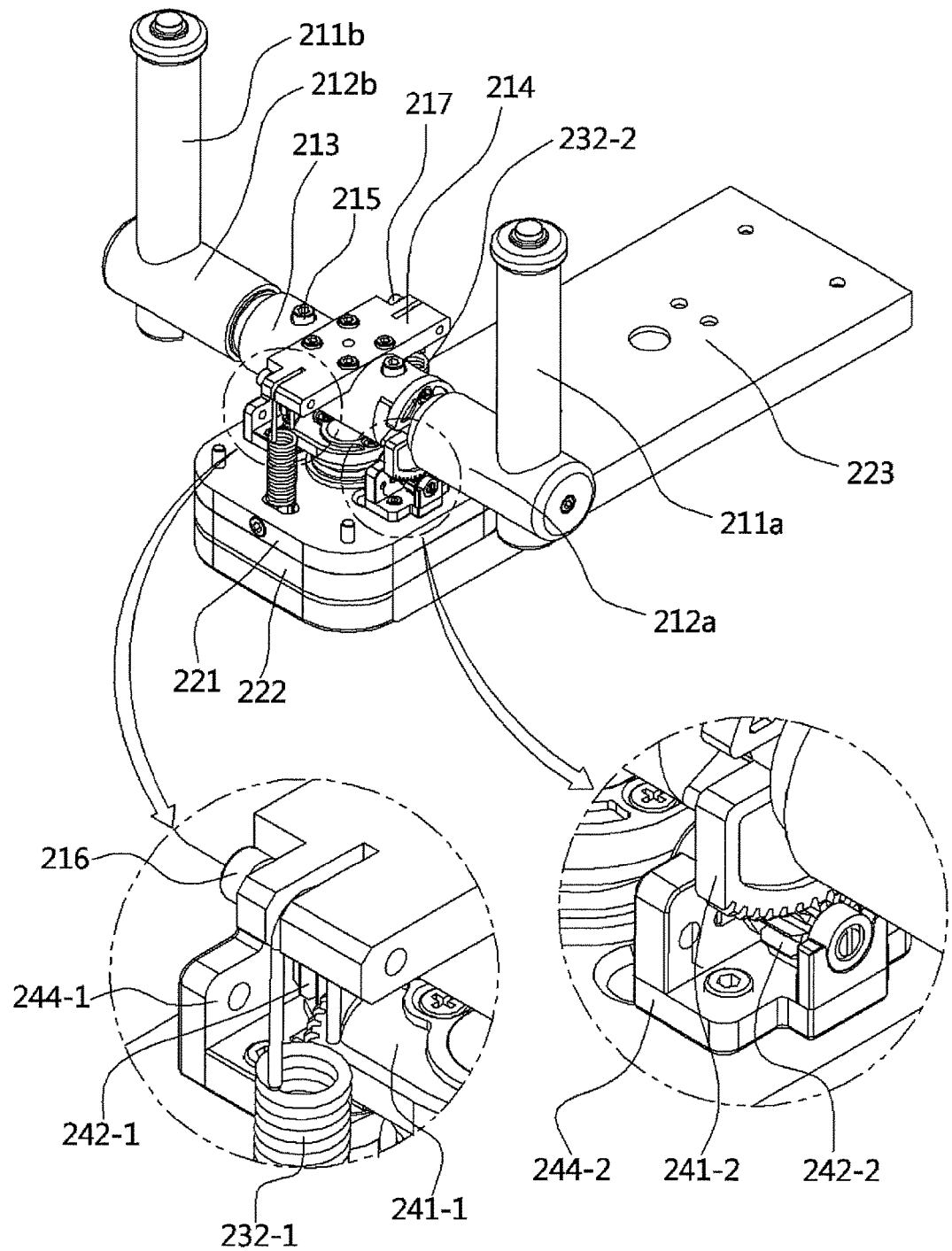
FIG. 12 is a perspective view illustrating a state in which a cover is removed from the control stick of FIG. 11 in an original state.
Figure 13:
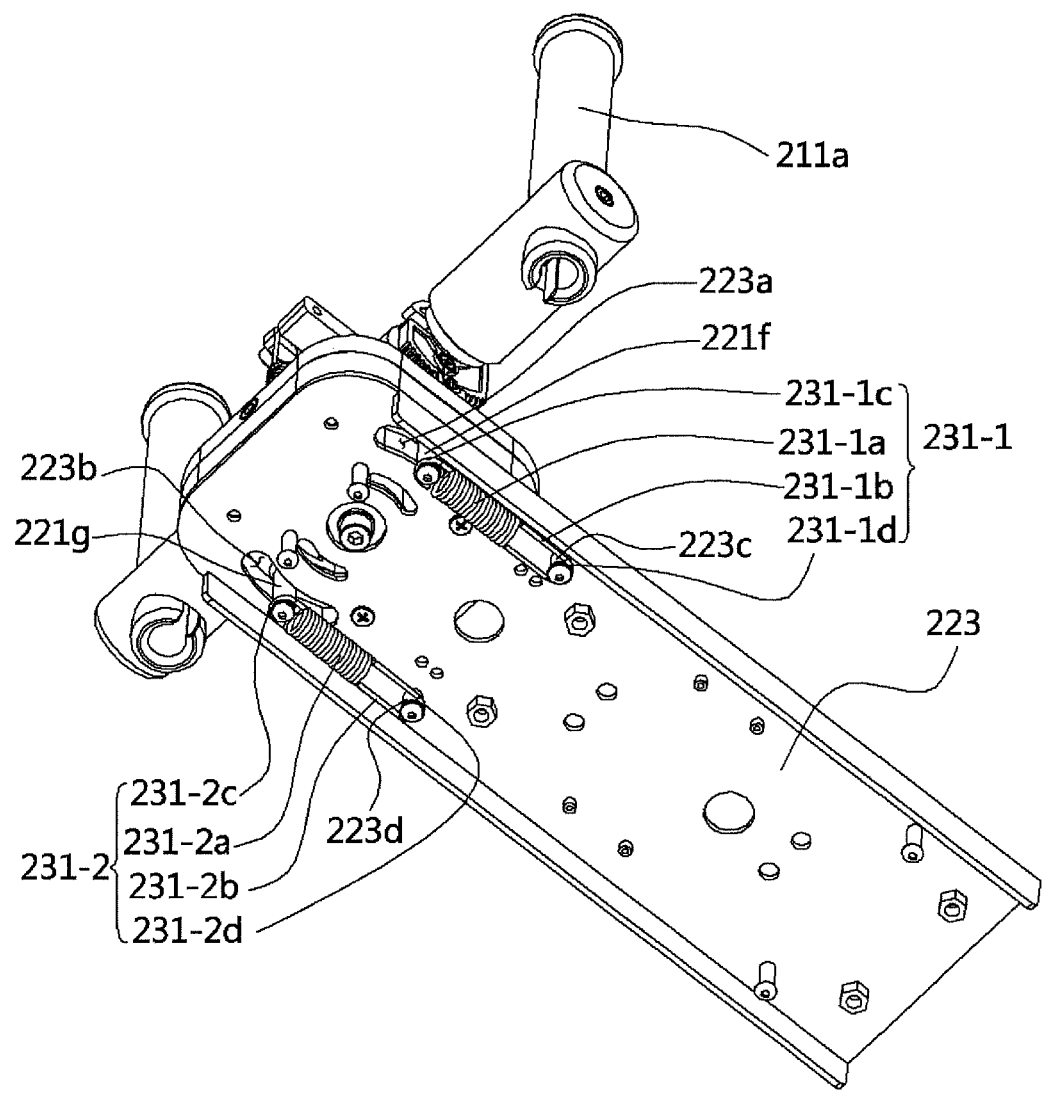
FIG. 13 is a bottom perspective view illustrating the control stick shown in FIG. 12 in the original state.
Figure 14:
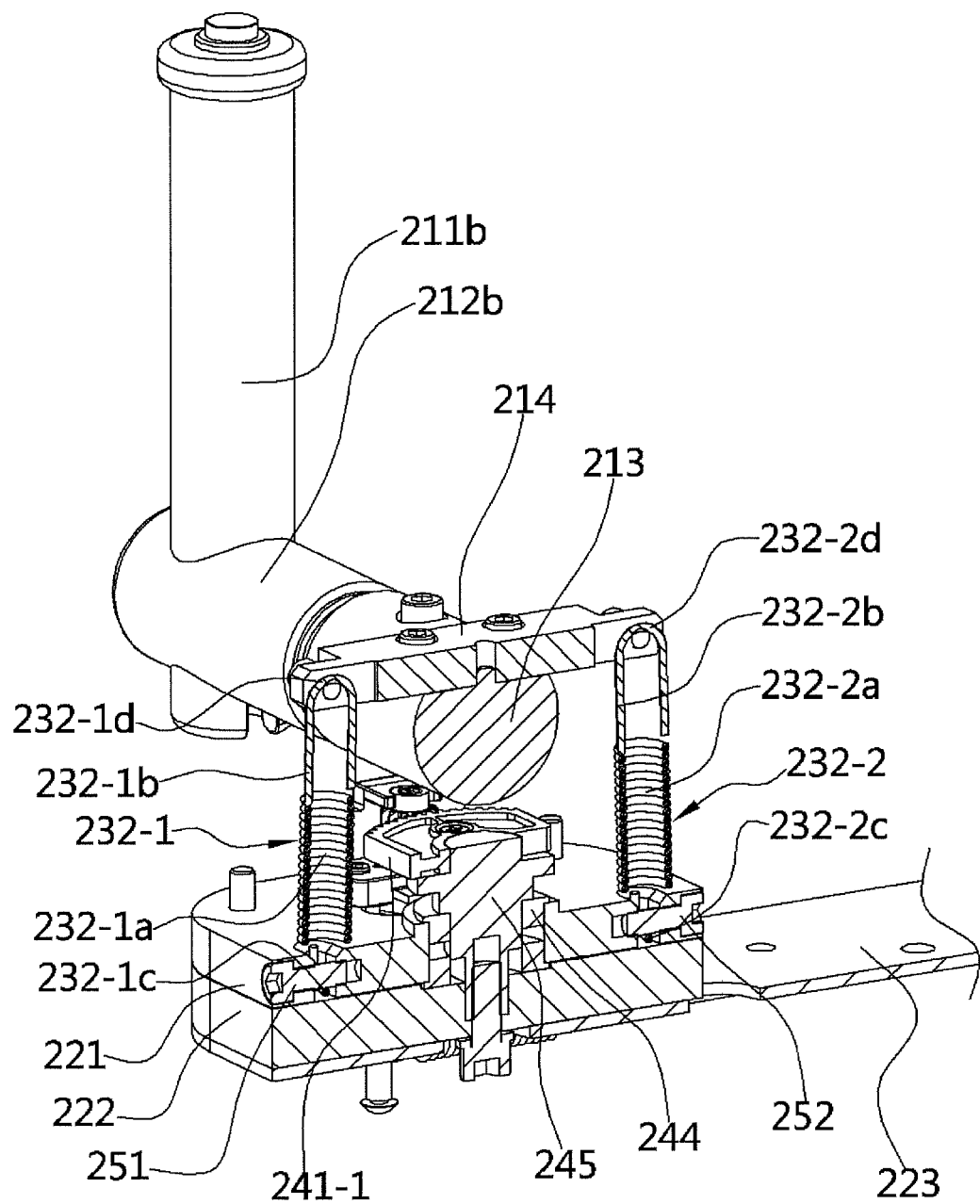
FIG. 14 is a cross-sectional view of the control stick shown in FIG. 12.
Figure 15:
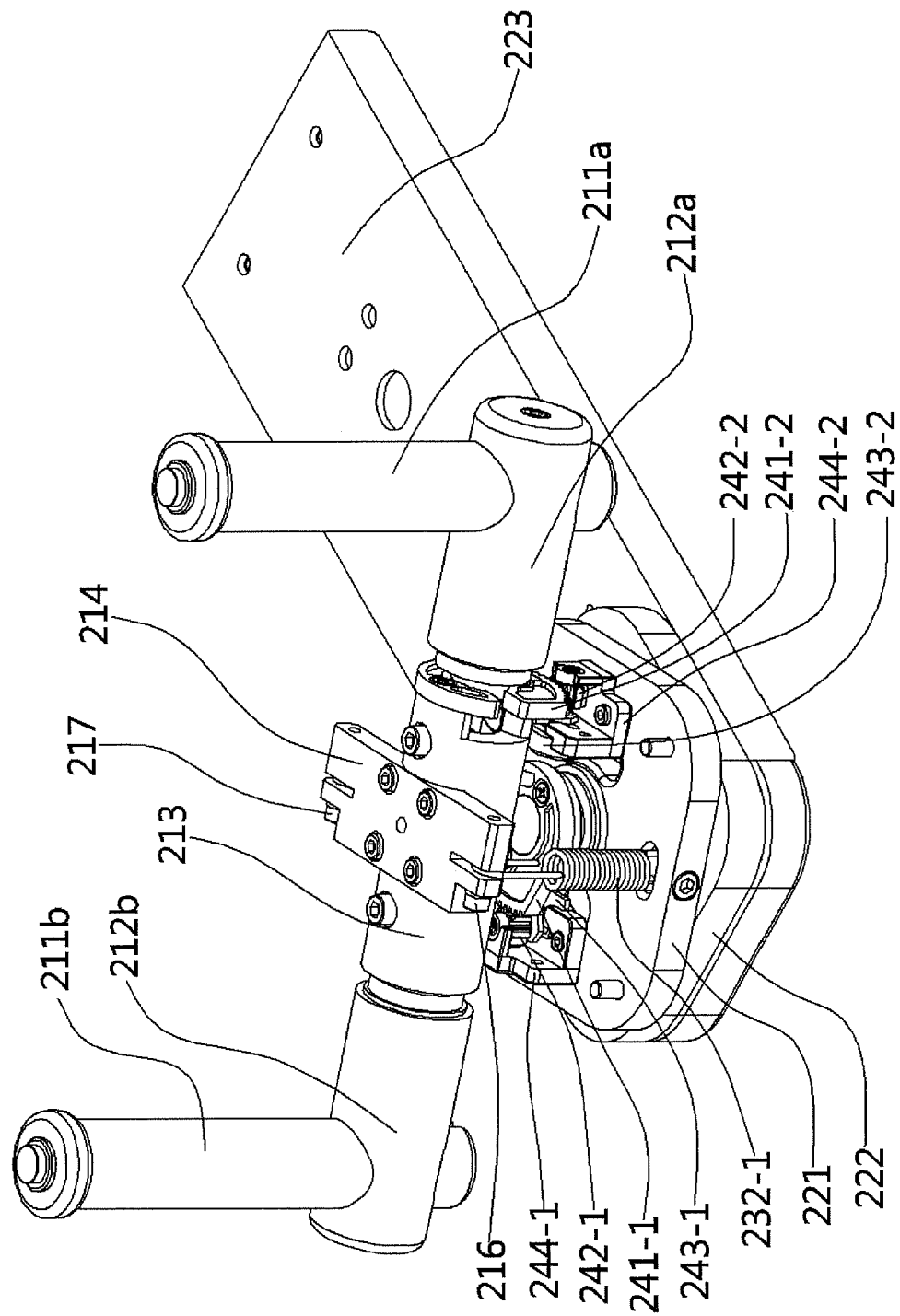
FIG. 15 is a perspective view illustrating a state in which the control stick of FIG. 12 has been rotated in a yawing direction.
Figure 16:
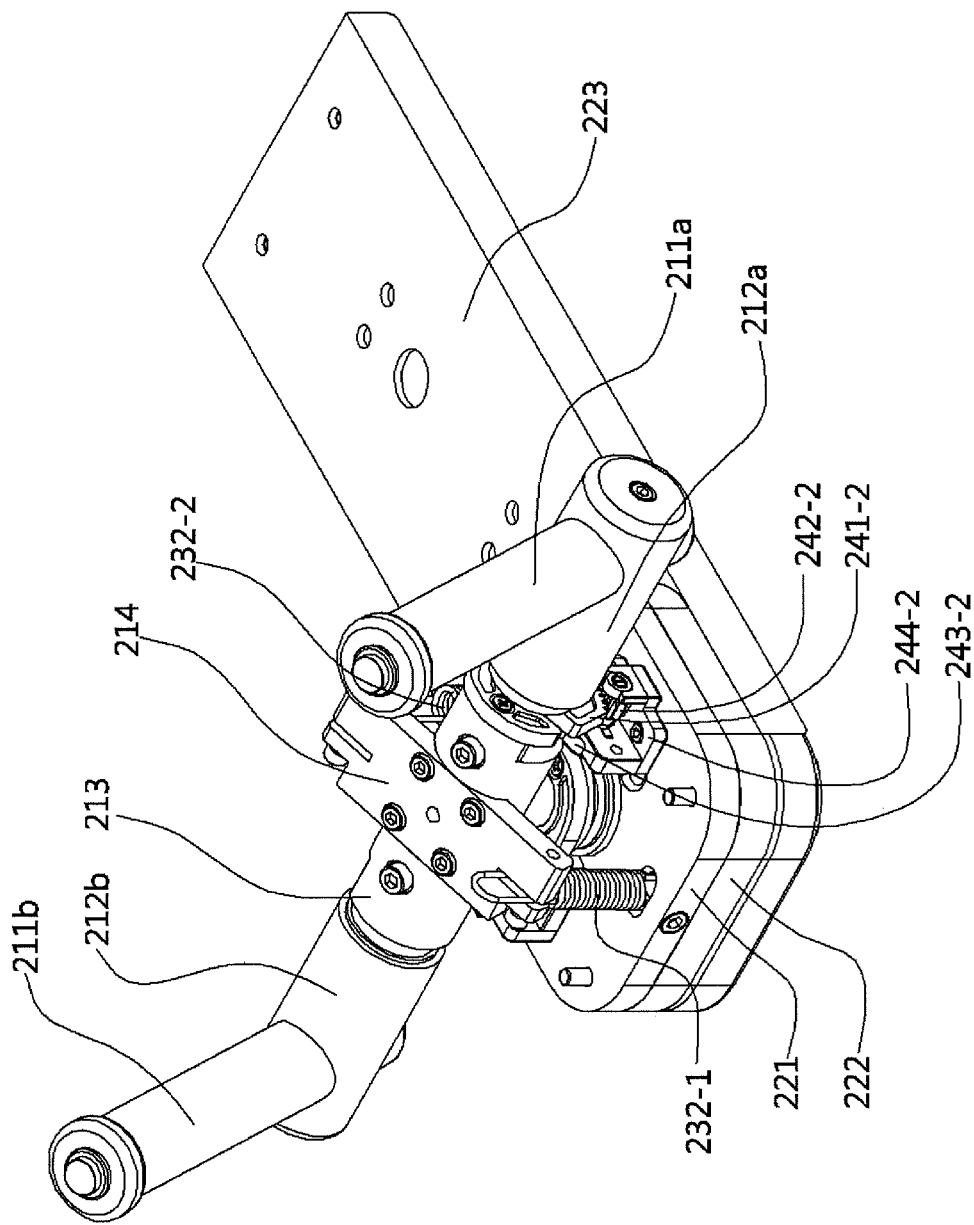
FIG. 16 is a perspective view illustrating a state in which the control stick of FIG. 12 has been rotated in a pitching direction.

Referring to FIGS. 10A and 10B, an operation of a case in which the control stick 100 according to the first embodiment is rotated in the pitching direction will be described.

FIG. 10A illustrates a case in which the handles 111*a* and 111*b*, the handle-connected rods 112*a* and 112*b*, and the rotating rod 113 do not rotate and are in the original state.

The spring holding portion 101-3*b*, which protrudes from the inner surface of the cover 101-3, and the spring holding portion 114*a*, which protrudes outward from the second spring fixing member 114, are located between the first end 132*b* and the second end 132*c* of the second spring 132. Here, the spring holding portion 101-3*b* and the spring holding portion 114*a* are located at different upper and lower heights. Here, the spring holding portion 114*a* is inserted in the guide groove 101-3*a* of the cover 101-3.

When the user holds the handles 111*a* and 111*b* and rotates the rotating rod 113 in the pitching direction in the state of FIG. 10A, a state shown in FIG. 10B occurs.

The second cam 141-2 and the second spring fixing member 114 and the spring holding portion 114*a* integrated therewith pitch-rotate, according to rotation of the rotating rod 113, on the central shaft of the rotating rod 113. On the other hand, the spring holding portion 101-3*b* and the second gear 142-2 do not pitch-rotate and are fixed. However, the second gear 142-2 rotates on its axis in place.

Also, as the spring holding portion 114*a* rotates, the first end 132*b* of the second spring 132 is held and also rotates. In this case, the second end 132*c* of the second spring 132 becomes held by the spring holding portion 101-3*a* and does not rotate any more.

Due to this, the wound portion 132*a* of the second spring 132 is tensioned. When the user rotates the handles 111*a* and 111*b* to the original point or releases the handles 111*a* and 111*b*, the wound portion 132*a* returns to the original state of FIG. 10A due to an elastic restoration force thereof.

Also, as the second gear 142-2 rotates on its axis, the second rotation angle measurement portion 143-2 measures the rotation angle in the pitching direction.

Although only the cases in which the rotating rod 113 rotates in the yawing direction and the pitching direction have been described above, it is possible to rotate the rotating rod 113, when it has been rotated in the yawing direction, in the pitching direction at the same time. When the rotating rod 113 is rotated in the yawing direction and the pitching direction at the same time as described above, torsion occurs at the first spring 131 and the second spring 132 at the same time and then the first spring 131 and the second spring 132 may return to the original point, and the first rotation angle measurement portion 143-1 and the second rotation angle measurement portion 143-2 may measure a rotation angle in the yawing direction and a rotation angle in the pitching direction at the same time.

Second Embodiment

Referring to FIGS. 11 to 16, a control stick 200 of a motion simulator according to a second embodiment will be described.

In comparison to the first embodiment, the control stick 200 of the motion simulator according to the second embodiment is of a rotary type in which a first rotation angle measurement portion 243-1 and a second rotation angle measurement portion 243-2 measure rotation angles in a yawing direction and a pitching direction when a rotating rod 213 rotates in the yawing direction and the pitching direction, as happens in the first embodiment, but includes a pair of first springs 231-1 and 231-2 and a pair of second springs 232-1 and 232-2 to return the rotating rod 213 to an original point, which is different from the first embodiment.

The control stick 200 of the second embodiment includes covers 201-1, 201-2, 201-3, and 201-4 which surround an exterior thereof, a rotating plate 221, a fixed plate 222, and a bottom plate 223 stacked below the covers 201-1, 201-2, 201-3, and 201-4, a pair of handle-connected rods 212*a* and 212*b* which protrude toward both the covers 201-1 and 201-3, handles 211*a* and 211*b* coupled to the handle-connected rods 212*a* and 212*b*, and the rotating rod 213 coupled between the pair of handle-connected rods 212*a* and 212*b*, akin to the first embodiment.

Accordingly, when a user holds and rotates the handles 211*a* and 211*b* in the yawing direction, the handle-connected rods 212*a* and 212*b*, the rotating rod 213, the handles 211*a* and 211*b*, and the covers 201-1, 201-2, 201-3, and 201-4 integrally rotate around a first cam connection member 245 which will be described below.

When the user holds and rotates the handles 211*a* and 211*b* in the pitching direction, the handle-connected rods 212*a* and 212*b*, the rotating rod 213, and the handles 211*a* and 211*b* integrally rotate on a central axis of the rotating rod 213 as a rotational center thereof. In this case, since the handle-connected rods 212*a* and 212*b* rotate in the through holes of the covers 201-1 and 201-3, the covers 201-1, 201-2, 201-3, and 201-4 remain in a fixed state.

The first rotation angle measurement portion 243-1 is fixed to a first bracket 244-1 coupled to a top of the rotating plate 221 using a fastening member. A first gear 242-1 which includes teeth formed on an outer circumferential surface is coupled with the first rotation angle measurement portion 243-1.

A first cam 241-1 which includes teeth formed on an outer circumferential surface engages with the first gear 242-1. The first cam 241-1 is coupled to a top end of the first cam connection member 245, and the first cam connection member 245 passes through the rotating plate 221 such that a bottom end thereof is coupled to the fixed plate 222. Accordingly, the first cam 241-1, the first cam connection member 245, and the fixed plate 222 are independent from the rotation of the rotating plate 221 in the yawing direction and are positioned to be fixed.

When the rotating rod 213 is rotated in the yawing direction, since the first rotation angle measurement portion 243-1 rotates along with the rotating plate 221 and the first cam 241-1 does not rotate and is fixed, the first gear 242-1 coupled to the first rotation angle measurement portion 243-1 rotates on the central axis of the rotating plate 221 as a rotational center thereof and simultaneously rotates on its axis by an angle corresponding to a rotation angel of the rotating rod 213 in the yawing direction. When the first gear 242-1 rotates on its axis, the rotation is transferred to the first rotation angle measurement portion 243-1 and the rotation angle in the yawing direction is measured.

The second rotation angle measurement portion 243-2 is fixed to a second bracket 244-2 coupled to the top of the rotating plate 221 using a fastening member. A second gear 242-2 which includes teeth formed on an outer circumferential surface is coupled with the second rotation angle measurement portion 243-2.

A second cam 241-2 engages with the second gear 242-2 which includes teeth formed on an outer circumferential surface. The second cam 241-2 is integrated and coupled with the handle-connected rod 212a coupled with the rotating rod 213. Accordingly, the second cam 241-2 rotates with the rotating rod 213 during pitching rotation of the rotating rod 113.

When the user holds and rotates the handles 211a and 211b in the pitching direction, the rotating rod 213 and the second cam 241-2 rotate in the pitching direction together. In this case, the second gear 242-2, which engages with the second cam 241-2, rotates on a central axis thereof by an angle corresponding to a rotation angle of the rotating rod 213 in the pitching direction. When the second gear 242-2 rotates on its axis, the rotation is transferred to the second rotation angle measurement portion 243-2 and the rotation angle in the pitching direction is measured.

The pair of first springs 231-1 and 231-2 are provided on a bottom surface of the bottom plate 223. The first spring 231-1 on one side and the first spring 231-2 on the other side may be formed of tension springs which have lengths in a forward and backward direction and are tensional in the forward and backward direction.

The first springs 231-1 and 231-2 include wound portions 231-1a and 231-2a, rotation absorbers 231-1b and 231-2b, first holding ends 231-1c and 231-2c, and second holding ends 231-1d and 231-2d.

The wound portions 231-1a and 231-2a are wound a plurality of times in a coil spring shape.

The first holding ends 231-1c and 231-2c are held by a pair of rotating plate holding portions 221f and 221g which protrude downward from the bottom surface of the rotating plate 221, and the second holding ends 231-1d and 231-2d are formed in a hook shape to be held by bottom plate holding portions 223c and 223d which protrude downward from the bottom surface of the bottom plate 223. The first holding ends 231-1c and 231-2c are connected to the wound portions 231-1a and 231-2a.

The rotation absorbers 231-1b and 231-2b connect the second holding ends 231-1d and 231-2d to the wound portions 231-1a and 231-2a, and the bottom plate holding portions 223c and 223d are inserted therein and formed to be a pair of linear-shaped wires parallel to each other. When the rotating plate 221 rotates in the yawing direction, the bottom plate holding portions 223c and 223d move in a space in the rotation absorbers 231-1b and 231-2b and have sections for absorbing a movement amount of the rotation of the rotating plate 221 to prevent the wound portions 231-1a and 231-2a from being compressed.

When the rotating rod 213 is rotated from an original point in a first yawing direction (a counterclockwise direction), the first spring 231-2 is tensioned and an elastic restoration force acts to return the rotating rod 213 to the original point.

When the rotating rod 213 is rotated from the original point in a second yawing direction (a clockwise direction) opposite to the first yawing direction, the second spring 231-1 is tensioned and an elastic restoration force acts to return the rotating rod 213 to the original point.

The pair of second springs 232-1 and 232-2 are provided in the front and rear of the rotating rod 213. The second spring 232-2 in the front and the second spring 232-1 in the rear may be formed of tension springs which have lengths in a vertical direction and are tensional in the vertical direction.

Since the second springs 232-1 and 232-2 include wound portions 232-1a and 232-2a, rotation absorbers 232-1b and 232-2b, first holding ends 232-1c and 232-2c, and second holding ends 232-1d and 232-2d and have the same shape as that of the first springs 231-1 and 231-2, a detailed description thereof will be omitted.

The first holding portions 232-1c and 232-2c are held by bolts 251 and 252 fastened to the rotating plate 221, and the second holding ends 232-1d and 232-2d are held by bolts 216 and 217 fastened to front/rear ends of a spring holding member 214.

The spring holding member 214 is integrated and coupled with the rotating rod 213 using a fastening member 215.

The wound portions 232-1a and 232-2a are connected to the first holding ends 232-1c and 232-2c, and the second holding ends 232-1d and 232-2d are connected to the rotation absorbers 232-1b and 232-2b.

When the rotating rod 213 is rotated from an original position in a first pitching direction (a clockwise direction when viewed from a right side of the control stick 200), the second spring 232-1 is tensioned and an elastic restoration force acts to return the rotating rod 213 to the original point.

When the rotating rod 213 is rotated from the original position in a second pitching direction (a counterclockwise direction when viewed from the right side of the control stick 200) opposite to the first pitching direction, the second spring 232-2 is tensioned and an elastic restoration force acts to return the rotating rod 213 to the original point.

Figure 17A:
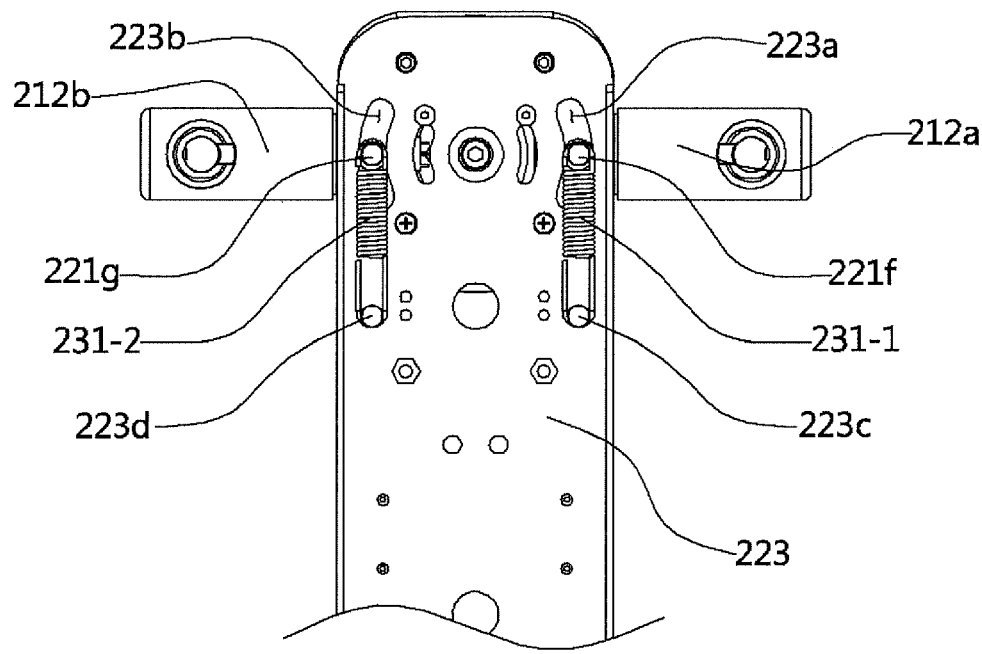
FIGS. 17A and 17B are bottom views illustrating the control stick of FIG. 12 before and after rotation in the yawing direction.
Figure 17B:
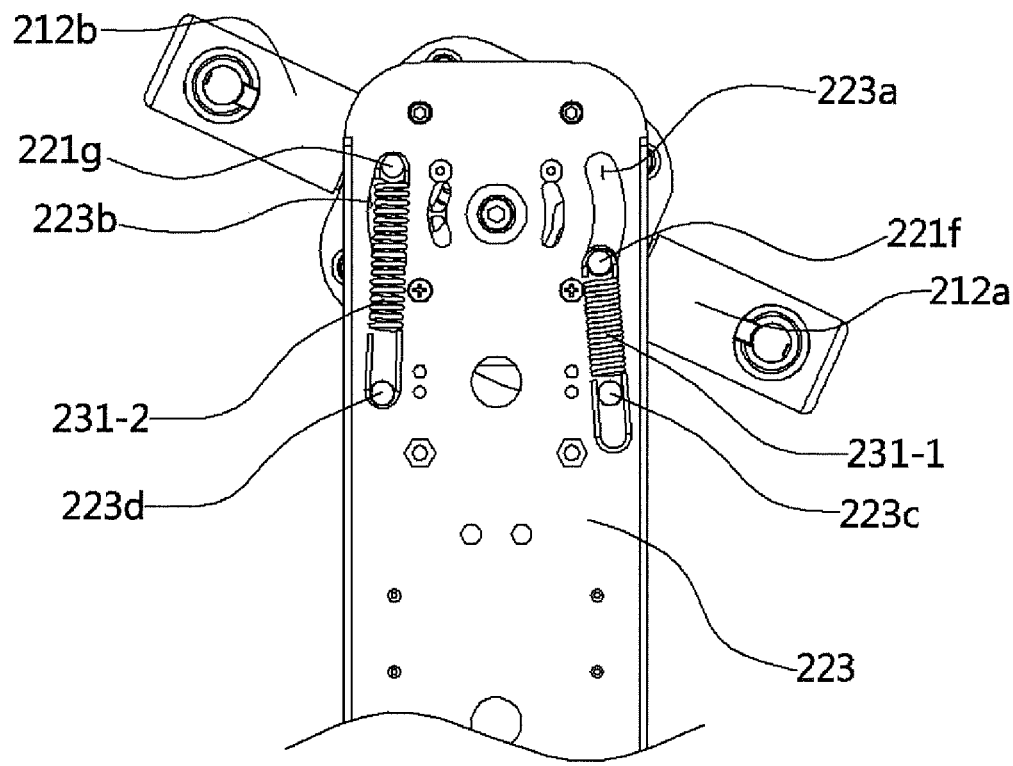

Referring to FIGS. 17A and 17B, an operation of a case in which the control stick 200 according to the second embodiment is rotated in the yawing direction will be described.

FIG. 17A illustrates a case in which the handles 211a and 211b, the handle-connected rods 212a and 212b, and the rotating rod 213 do not rotate and are in an original state.

The first holding ends 231-1c and 231-2c and the second holding ends 231-1d and 231-2d of the first springs 231-1 and 231-2 are respectively held by the rotating plate holding portions 221f and 221g and the bottom plate holding portions 223c and 223d. In this state, the wound portions 231-1a and 231-2a are in a state of being slightly tensioned.

When the user holds the handles 211a and 211b and rotates the rotating rod 213 in the yawing direction in the state of FIG. 17A, a state shown in FIG. 17B occurs.

That is, according to the rotation of the rotating rod 213, the rotating plate 221 and the rotating plate holding portions 221f and 221g rotate clockwise on a central shaft of the rotating plate 221 as a rotational center. The first spring 231-2 on one side is tensioned by the rotating plate holding portion 221g. In this case, the rotating plate holding portion 221g moves while being guided along a bottom plate guide hole 223b. On the other hand, the first spring 231-1 on the other side is not tensioned. As the rotating plate holding portion 221f moves along a bottom plate guide hole 223a, the bottom plate holding portion 223c varies in position in the rotation absorber 231-1b such that the wound portion 231-1a is not compressed and the entire first spring 231-1 moves.

As described above, since only one of the wound portions 231-1a and 231-2a of the two first springs 231-1 and 231-2 is tensioned and the other thereof is not compressed, durability is increased even when manipulation is repeatedly performed.

In this case, the first rotation angle measurement portion 243-1 measures a rotation angle in the yawing direction. Since the measurement of the rotation angle is like that of the first embodiment, a description thereof will be omitted.

Figure 18A:
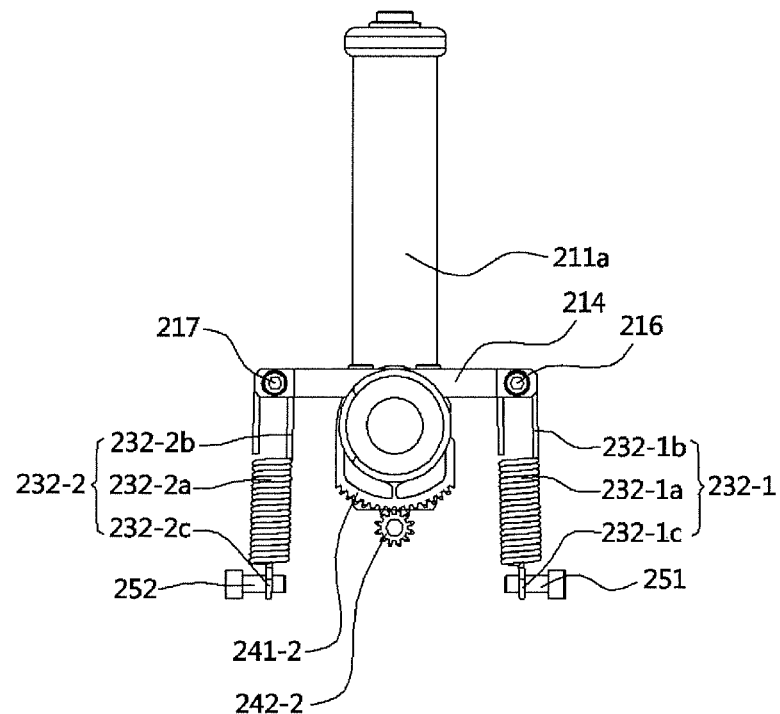
FIGS. 18A and 18B are left side views illustrating the control stick of FIG. 3 before and after rotation in the pitching direction.
Figure 18B:
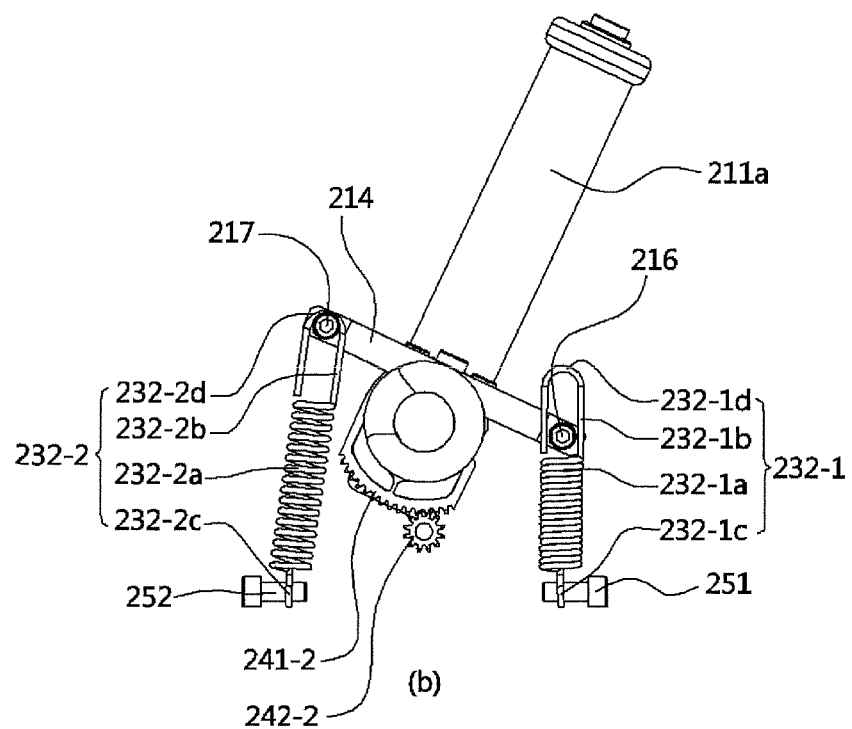

Referring to FIGS. 18A and 18B, an operation of a case in which the control stick 200 according to the second embodiment is rotated in the pitching direction will be described.

FIG. 18A illustrates a case in which the handles 211a and 211b, the handle-connected rods 212a and 212b, and the rotating rod 213 do not rotate and are in an original state.

The first holding ends 232-2c and 232-2c of the second springs 232-1 and 232-2 are held by the bolts 251 and 252, and the second holding ends 232-1d and 232-2d are held by the bolts 216 and 217. In this state, the wound portions 232-1a and 232-2a are in a state of being slightly tensioned.

When the user holds the handles 211a and 211b and rotates the rotating rod 213 in the pitching direction in the state of FIG. 18A, a state shown in FIG. 18B occurs.

According to the rotation of the rotating rod 213, the spring holding member 214 also rotates. In this case, the bolts 251 and 252 are fixed. According to the rotation of the spring holding member 214, the second holding end 232-2d of the second spring 232-2 moves upward such that the wound portion 232-2a is tensioned, and the bolt 216 held by the second holding end 232-1d of the second spring 232-1 moves in the rotation absorber 232-1b. Accordingly, the wound portion 232-1a is not compressed.

In this case, the second rotation angle measurement portion 243-2 measures a rotation angle in the pitching direction. Since the measurement of the rotation angle is like that of the first embodiment, a description thereof will be omitted.

Third Embodiment

Figure 19:
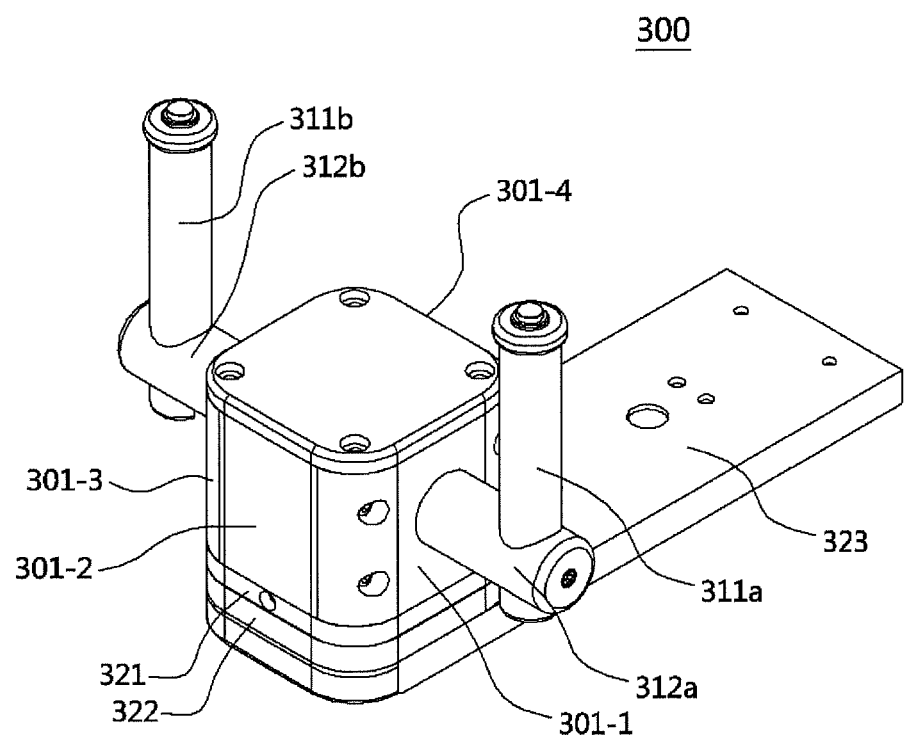
FIG. 19 is a perspective view illustrating an exterior of a control stick according to a third embodiment of the present invention.
Figure 20:
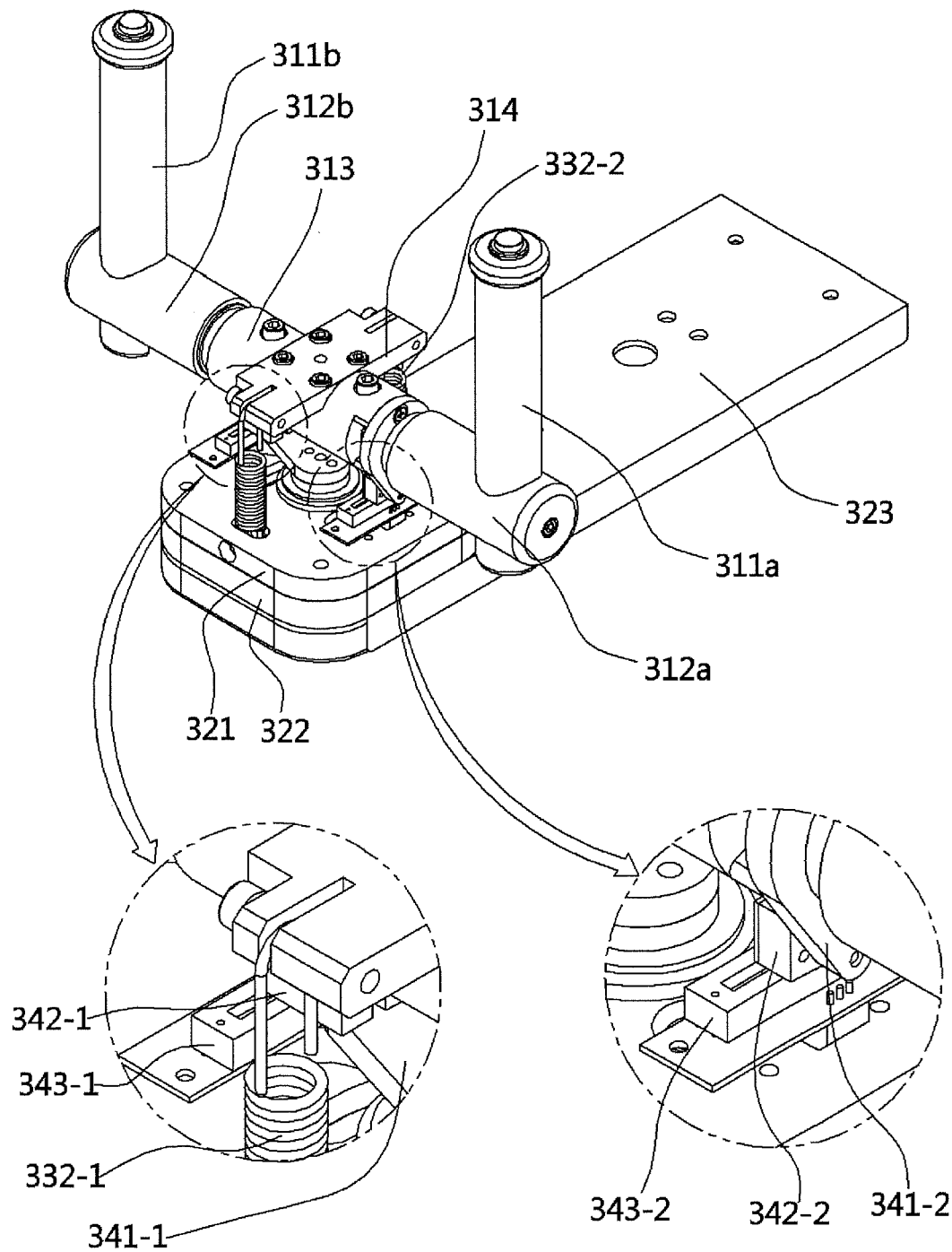
FIG. 20 is a perspective view illustrating a state in which a cover is removed from the control stick of FIG. 19 at an original state.
Figure 21:
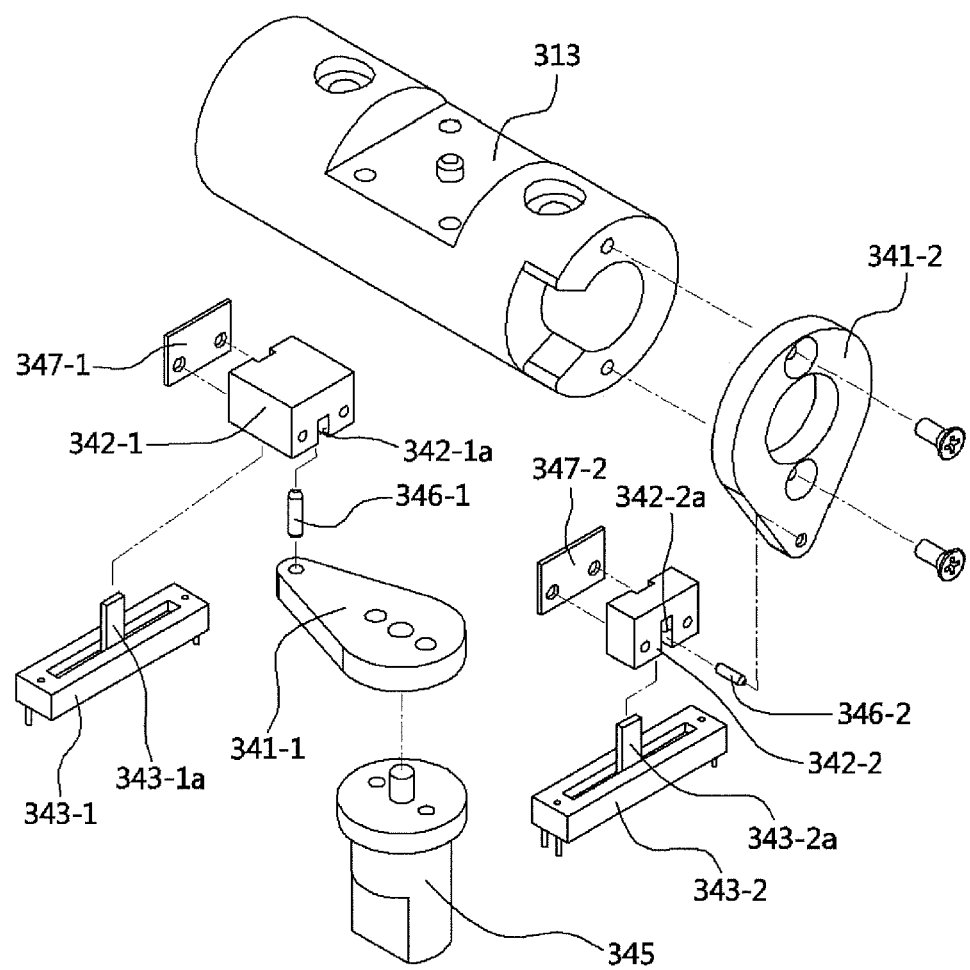
FIG. 21 is an exploded perspective view illustrating components of a first rotation angle measurement portion and a second rotation angle measurement portion in the control stick of FIG. 19.

Referring to FIGS. 19 to 21, a control stick 300 of a motion simulator according to a third embodiment will be described.

In the control stick 300 of the motion simulator according to the third embodiment, since first springs 331-1 and 331-2 are the same components as those of the first springs 231-1 and 231-2 of the second embodiment and provided on a bottom surface of a bottom plate 323, and second springs 332-1 and 332-2 are the same components as those of the second springs 232-1 and 232-2, a detailed description will be omitted below.

In the third embodiment, a first rotation angle measurement portion 343-1 and a second rotation angle measurement portion 343-2 are of a sliding type which measures a rotation angle when a rotational movement is converted into a linear movement, which is a different from the first embodiment and the second embodiment.

The control stick 300 of the third embodiment, which is identical to those in the first and second embodiments, includes covers 301-1, 301-2, 301-3, and 301-4 which surround an exterior thereof, a rotating plate 321, a fixed plate 322, and a bottom plate 323 stacked below the covers 301-1, 301-2, 301-3, and 301-4, a pair of handle-connected rods 312a and 312b which protrude toward both the covers 301-1 and 301-3, handles 311a and 311b coupled to the handle-connected rods 312a and 312b, and the rotating rod 313 coupled between the pair of handle-connected rods 312a and 312b.

The first rotation angle measurement portion 343-1 includes a mover 343-1a coupled with and fixed to an inside of the cover 301-3 on one side and moved forward and backward. The mover 343-1a is coupled between a first sliding member 342-1 and a coupling plate 347-1 provided above the first rotation angle measurement portion 343-1.

The first sliding member 342-1 has a body in a an approximately rectangular parallelepiped shape, and the body includes a slot 342-1a having a leftward and rightward length, and a height in a vertical direction, and with a bottom and left and right sides, which are opened.

There is provided a first cam 341-1 connected to the fixed plate 322, fixed and independent from the rotation of the rotating plate 321. The first cam 341-1 is coupled to a top end of a first cam connection member 345, and the first cam connection member 345 passes through the rotating plate 321 with a bearing 344 as an intermediary such that a bottom end thereof is coupled to the fixed plate 322.

A pin 346-1 is coupled to an outer end of the first cam 341-1, and the pin 346-1 is inserted in the slot 342-1a of the first sliding member 342-1. The slot 342-1a absorbs a displacement of the pin 346-1 during the rotation in a yawing direction.

Accordingly, when the rotating rod 313 rotates in the yawing direction, the rotating plate 321, the cover 301-3, and the first rotation angle measurement portion 343-1 rotate with the rotating rod 313 in the yawing direction. In this case, since the first cam 341-1 is fixed in position and the mover 343-1a, which is coupled to one side of the first sliding member 342-1, moves along a longitudinal direction of the first rotation angle measurement portion 343-1, the first rotation angle measurement portion 343-1 measures a rotation angle of the rotating rod 313 in the yawing direction corresponding to a movement amount of the mover 343-1a.

The second rotation angle measurement portion 343-2 includes a mover 343-2a coupled with and fixed to an inside of the cover 301-1 on the other side and is moved forward and backward. The mover 343-2a is inserted and coupled between a second sliding member 342-2 and a coupling plate 347-2 provided above the second rotation angle measurement portion 343-2.

The second sliding member 342-2 has a body in an approximately rectangular parallelepiped shape, and the body includes a slot 342-2a having a leftward and rightward length and, a height in a vertical direction, and with a bottom and left and right sides which are opened.

There is provided a second cam 341-2 which is integrated and coupled with the rotating rod 313 and the handle-connected rod 312a and integrally rotates with the rotating rod 313 when the rotating rod 313 rotates in a pitching direction. A pin 346-2 is coupled to a lower end of the second cam 341-2, and the pin 346-2 is inserted in the slot 342-2a of the second sliding member 342-2. The slot 342-2a absorbs a displacement of the pin 346-2 during the rotation in the pitching direction.

Accordingly, when the rotating rod 313 rotates in the pitching direction, the second cam 341-2 also rotates in the pitching direction. In this case, since the second rotation angle measurement portion 343-2 is fixed in position and the mover 343-2a, which is coupled to the second sliding member 342-2, moves along a longitudinal direction of the first rotation angle measurement portion 343-1, the first rotation angle measurement portion 343-1 measures a rotation angle of the rotating rod 313 in the pitching direction corresponding to a movement amount of the mover 343-2a.

Figure 22A:
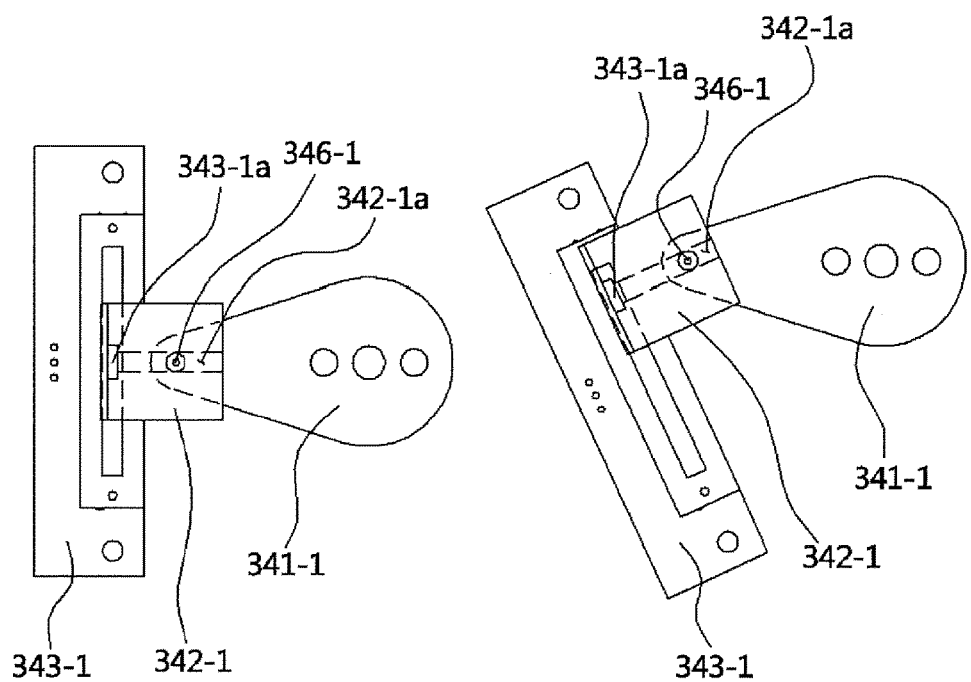
FIGS. 22A and 22B are, respectively, a plan view and a side view illustrating the control stick of FIG. 19 before and after rotation.
Figure 22B:
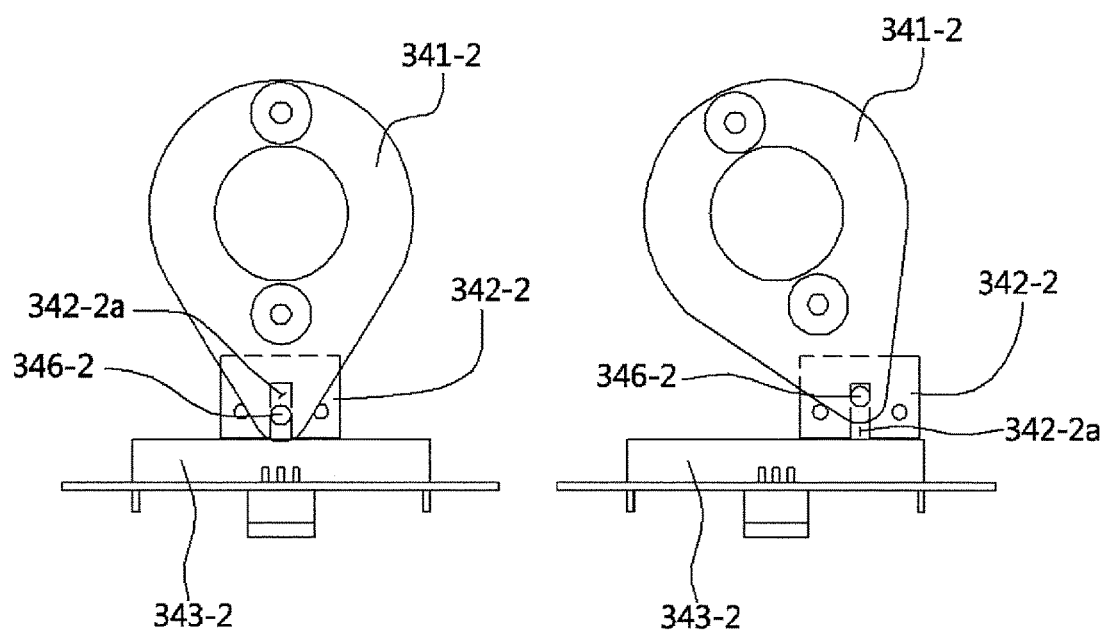

Referring to FIGS. 22A and 22B, operations of a case in which the control stick 300 according to the third embodiment is rotated in the yawing direction and the pitching direction will be described.

FIG. 22A illustrates the control stick 300 before and after rotation in the yawing direction. When the rotating rod 313 rotates in the yawing direction, the first cam 341-1 is fixed and the first rotation angle measurement portion 343-1 rotates with the rotating plate 321 in the yawing direction.

In this case, since the first cam 341-1 and the pin 346-1 are fixed, the first sliding member 342-1 varies in position in the slot 342-1a along a longitudinal direction. Simultaneously, the mover 343-1a moves in position at the first rotation angle measurement portion 343-1 and measures a rotation angle.

FIG. 22B illustrates the control stick 300 before and after rotation in the pitching direction. Accordingly, when the rotating rod 313 rotates in the pitching direction, the second cam 341-2 and the pin 346-2 rotate together in the pitching direction. According to rotation of the pin 346-2, the second sliding member 342-2 linearly moves with the mover 343-2a to measure the rotation angle in the pitching direction. In this case, since the pin 346-2 varies in position in a vertical direction, a vertical position in the slot 342-2a varies.

According to one embodiment of the present invention, when a control stick of a motion simulator is manipulated, rotation angles in a yawing direction and a pitching direction are measured and a rotating rod is allowed to automatically return to an original point such that operation of the motion simulator may be easily performed.

Also, two torsion springs are used to enable return to the original point in the yawing direction and the pitching direction, such that the number of springs may be reduced to simplify structure.

Also, since one end of the torsion spring is fixed and the other end thereof is tensioned in a direction of winding of the torsion spring, a load applied to the torsion spring is reduced such that the durability of the torsion spring may be increased.

Also, since four tension springs are used but only two of the springs are tensioned during rotation in the yawing direction or the pitching direction while the other two of the springs are configured not to receive a tension force or a compression force, durability may be increased.

Also, manipulating operations of the control stick with respect to the yawing direction and the pitching direction may be precisely transferred to a controller to perform control.

What is claimed is:

1. A control stick of a motion simulator, comprising:
a rotating rod rotated by a user in a yawing direction and a pitching direction;
a first spring which returns the rotating rod to an original point when the rotating rod rotates in the yawing direction;
a first rotation angle measurement portion which measures a rotation angle of the rotating rod in the yawing direction and transmits the measured rotation angle to a controller of the motion simulator;
a second spring which returns the rotating rod to an original point when the rotating rod rotates in the pitching direction; and
a second rotation angle measurement portion which measures a rotation angle of the rotating rod in the pitching direction and transmits the measured rotation angle to the controller of the motion simulator.

2. The control stick of claim 1, wherein the first rotation angle measurement portion is of a rotary type which measures the rotation angle of the rotating rod in the yawing direction when the rotating rod rotates in the yawing direction.

3. The control stick of claim 2, comprising:
a first cam which is fixed to be independent from the rotation of the rotating rod and comprises teeth formed on an outer circumferential surface; and
a first gear which is engaged with the teeth of the first cam, rotates by an angle corresponding to the rotation angle of the rotating rod in the yawing direction, and is coupled to the first rotation angle measurement portion to transmit the rotation angle thereof.

4. The control stick of claim 3, comprising:
a rotating plate to which the first rotation angle measurement portion is coupled and which also rotates when the rotating rod rotates in the yawing direction; and
a fixed plate fixed to be independent from the rotation of the rotating plate and to which the first cam is connected.

5. The control stick of claim 4, wherein the fixed plate is stacked below the rotating plate, and the control stick comprising a first cam connection member provided between the fixed plate and the first cam, with a bottom end coupled to the fixed plate and a top end passing through the rotating plate and connected to the first cam.

6. The control stick of claim 1, wherein the second rotation angle measurement portion is of a rotary type which measures the rotation angle of the rotating rod in the pitching direction when the rotating rod rotates in the pitching direction.

7. The control stick of claim 6, comprising:
a cam which rotates as the rotating rod rotates in the pitching direction and comprises teeth formed on an outer circumferential surface; and
a gear which is engaged with the teeth of the cam, rotates by an angle corresponding to the rotation angle of the rotating rod in the pitching direction, and is coupled to the second rotation angle measurement portion to transmit the rotation angle thereof.

8. The control stick of claim 7, comprising:
a rotating plate to which the second rotation angle measurement portion is coupled and which is independent from the rotation of the rotating rod in the pitching direction; and
a fixed plate fixed to be independent from the rotation of the rotating plate and stacked below the rotating plate.

9. The control stick of claim 1, wherein the first spring is formed of a torsion spring wound to allow any one of the two ends thereof to be fixed and the other end to rotate with the rotating rod and apply an elastic restoration force when the rotating rod rotates in the yawing direction.

10. The control stick of claim 9, comprising a rotating plate which also rotates when the rotating plate rod rotates in the yawing direction and a fixed plate independent from the rotation of the rotating plate and stacked below the rotating plate,
wherein one of the two ends of the first spring is held by a spring holding member coupled to the rotating plate and tensioned to allow the wound portion of the first spring to be twisted when the rotating plate rotates and the other end is held by a spring holding portion connected to the fixed plate, independent from the rotation of the rotating rod and fixed in position.

11. The control stick of claim 10, comprising:
a first cam lower connection member with a bottom end coupled to the fixed plate and an exterior on which the first spring is wound;
a first cam upper connection member coupled to a top end of the first cam lower connection member and at which the spring holding portion is formed;
a first cam which is fixed to be independent from the rotation of the rotating rod, comprises teeth formed on an outer circumferential surface, and is coupled to the first cam upper connection member; and
a first gear which is engaged with the teeth of the first cam, rotates by an angle corresponding to the rotation angle of the rotating rod in the yawing direction, and is coupled to the first rotation angle measurement portion to transmit the rotation angle thereof.

12. The control stick of claim 10, wherein the first cam upper connection member at which the spring holding portion protrudes is connected to the fixed plate,
wherein a guide groove into which the spring holding portion is inserted, guides rotation of the spring holding portion when the rotating rod rotates in the yawing direction, and into which the spring holding member is inserted is formed at the rotating plate, and
wherein the spring holding portion and the spring holding member are provided at positions spaced apart in a radial direction from a rotational center of the rotating plate.

13. The control stick of claim 1, wherein the second spring is formed of a torsion spring wound to allow any one of the two ends thereof to be fixed and the other end to rotate with the rotating rod and apply an elastic restoration force when the rotating rod rotates in the pitching direction.

14. The control stick of claim 13, comprising:
a spring fixing member, which is coupled to the rotating rod to also rotate when the rotating rod rotates in the pitching direction and protrudes in an axial direction of the rotating rod and at which a spring holding portion holds one of the two ends of the second spring to allow the torsion spring to be tensioned when the rotating rod rotates in the pitching direction; and
a cover at which a spring holding portion fixed in a position independent from the rotation of the rotating rod in the pitching direction and by which the one end of the two ends of the second spring is held is formed.

15. The control stick of claim 14, wherein the cover comprises a guide groove into which the spring holding portion of the spring fixing member is inserted to guide rotation of the spring holding portion when the rotating rod rotates in the pitching direction.

16. The control stick of claim 1, wherein a pair of such first springs are provided to face each other,
wherein when the rotating rod is rotated in any one of a first yawing direction and a second yawing direction, which are opposite to each other, any one of the pair of first springs is tensioned such that an elastic restoration force acts to return the rotating rod to the original point, and
wherein when the rotating rod is rotated in a direction opposite to the direction in which the first spring is tensioned, the other first spring is tensioned such that an elastic restoration force acts to return the rotating rod to the original point.

17. The control stick of claim 16, wherein one end of the first spring is connected to a rotating plate which also rotates when the rotating rod rotates in the yawing direction, and the other end thereof is connected to a bottom plate fixed to be independent from the rotation of the rotating rod in the yawing direction.

18. The control stick of claim 17, wherein a pair of rotating plate holding portions protrude from the rotating plate, by which the one ends of the first springs are held, respectively,
wherein a pair of bottom plate holding portions protrude from the bottom plate, by which the other ends of the first springs are held, respectively, and
wherein a pair of bottom plate guide holes formed of long holes having sections along a rotational direction of the rotating plate to allow the pair of rotating plate holding portions to be inserted therein to guide the rotation of the rotating plate.

19. The control stick of claim 18, wherein the first spring comprises:
a first holding end and a second holding end formed on both ends thereof to be held by one of the pair of rotating plate holding portions and one of the pair of bottom plate holding portions, respectively;
a wound portion connected to the first holding end and wound in a coil spring shape; and
a rotation absorber which connects the second holding end to the wound portion and has a section for allowing the bottom plate holding portion to be inserted therein to absorb rotation of the rotating plate to prevent the wound portion from being compressed.

20. The control stick of claim 1, wherein a pair of such second springs are provided to face each other,
wherein when the rotating rod is rotated in any one of a first pitching direction and a second pitching direction, which are opposite to each other, any one of the pair of second springs is tensioned such that an elastic restoration force acts to return the rotating rod to the original point, and
wherein when the rotating rod is rotated in a direction opposite to the direction in which the second spring is tensioned, the other second spring is tensioned such that an elastic restoration force acts to return the rotating rod to the original point.

21. The control stick of claim 20, wherein a spring holding member is integrated and coupled with the rotating rod,
wherein a rotating plate which also rotates when the rotating rod rotates in the yawing direction is provided,
wherein one ends of the pair of second springs are held by both ends of the spring holding member, and
wherein the other ends of the pair of second springs are held by one side and the other side of the rotating plate.

22. The control stick of claim 21, wherein the second spring comprises:
a first holding end and a second holding end formed on both ends thereof to be held by the spring holding member and the rotating plate, respectively;
a wound portion connected to the second holding end and wound in a coil spring shape; and
a rotation absorber which connects the first holding end to the wound portion and has a section for allowing a holding portion of the spring holding member to be inserted therein to absorb rotation of the rotating rod to prevent the wound portion from being compressed.

23. The control stick of claim 1, further comprising:
a first cam fixed to be independent from the rotation of the rotating rod in the yawing direction; and
a first sliding member which comprises a slot into which a pin coupled to an end of the first cam is inserted, wherein a mover of the first rotation angle measurement portion is integrated and coupled with one side of the first sliding member, and wherein a rotation angle of the rotating rod in the yawing direction, corresponding to a linear movement of the mover when the rotating rod rotates in the yawing direction, is measured by the first rotation angle measurement portion.

24. The control stick of claim 1, further comprising:

a cam which rotates according to the rotation of the rotating rod in the pitching direction; and a sliding member which comprises a slot into which a pin coupled to an end of the cam is inserted, wherein a mover of the second rotation angle measurement portion is integrated and coupled with one side of the sliding member, and wherein a rotation angle of the rotating rod in the pitching direction, corresponding to a linear movement of the mover when the rotating rod rotates in the pitching direction, is measured by the second rotation angle measurement portion.

* * * * *